US012548380B2

(12) United States Patent
Hone et al.

(10) Patent No.: US 12,548,380 B2
(45) Date of Patent: Feb. 10, 2026

(54) SYSTEMS AND METHODS FOR GENERATING AND PROVIDING FLUID ANALYSIS REPORTS

(71) Applicant: Cummins Inc., Columbus, IN (US)

(72) Inventors: James Hone, Franklin, IN (US); Ryan E. Denton, Franklin, IN (US); Chung-Hsuan Huang, Columbus, IN (US); Todd B. Reel, Mount Pleasant, IN (US); Justin W. Perry, Columbus, IN (US); Phillip E. Shelton, Columbus, IN (US); Corey W. Trobaugh, Columbus, IN (US)

(73) Assignee: Cummins Inc., Columbus, IN (US)

( * ) Notice: Subject to any disclaimer, the term of this patent is extended or adjusted under 35 U.S.C. 154(b) by 791 days.

(21) Appl. No.: 17/549,576

(22) Filed: Dec. 13, 2021

(65) Prior Publication Data

US 2023/0186688 A1 Jun. 15, 2023

(51) Int. Cl.
*G07C 5/00* (2006.01)
*G07C 5/08* (2006.01)

(52) U.S. Cl.
CPC ............. *G07C 5/006* (2013.01); *G07C 5/008* (2013.01); *G07C 5/0808* (2013.01); *G07C 5/0825* (2013.01)

(58) Field of Classification Search
CPC ...... G07C 5/006; G07C 5/008; G07C 5/0808; G07C 5/0825; B60R 16/0234; G06Q 10/20; G06Q 50/40
See application file for complete search history.

(56) References Cited

U.S. PATENT DOCUMENTS

| | | | | |
|---|---|---|---|---|
| 7,065,454 | B2 | 6/2006 | Hayzen et al. | |
| 7,424,399 | B2 * | 9/2008 | Kahn | G01N 33/18 702/50 |
| 8,977,421 | B2 | 3/2015 | Dvorak et al. | |
| D756,371 | S | 5/2016 | Bertnick et al. | |

(Continued)

OTHER PUBLICATIONS

Cummins MarketPlace. "FluidWatch Products", Cummins Inc., 2021. Accessed Jul. 30, 2021 at https://marketplace.cummins.com/CMIStore/ccrz__Products?categoryId=a224N000005U4dTQAS&cclcl=en_US.

(Continued)

*Primary Examiner* — Jelani A Smith
*Assistant Examiner* — Paul A Castro
(74) *Attorney, Agent, or Firm* — Foley & Lardner LLP

(57) ABSTRACT

Systems, methods, and apparatuses for generating a fluid analysis report with key issues to improve vehicle maintenance are provided. A processing circuit is configured to: obtain information regarding a plurality of fluids from a plurality of vehicles; determine a plurality of thresholds based on the information; analyze a fluid sample from a particular vehicle to identify a fluid type of the fluid sample; identify a vehicle type of the particular vehicle associated with the fluid sample; retrieve a population of the obtained information pertinent to at least one of the identified fluid type of the fluid sample or the vehicle type of the particular vehicle; retrieve at least one threshold associated with the retrieved population; compare a characteristic of the fluid sample to the retrieved at least one threshold; and generate and provide a dynamic graphical user interface regarding the comparison to a computing device.

20 Claims, 13 Drawing Sheets

700C

(56) References Cited

U.S. PATENT DOCUMENTS

| | | | | |
|---|---|---|---|---|
| D773,478 | S | 12/2016 | Wesley et al. | |
| D795,273 | S | 8/2017 | Rhodes et al. | |
| D795,274 | S | 8/2017 | Rhodes et al. | |
| D816,689 | S | 5/2018 | Chalker et al. | |
| D829,749 | S | 10/2018 | Kang et al. | |
| D839,276 | S | 1/2019 | Majumdar et al. | |
| D913,310 | S | 3/2021 | Murphy et al. | |
| D918,242 | S | 5/2021 | Paka et al. | |
| D934,884 | S | 11/2021 | Bergenstal et al. | |
| D939,540 | S | 12/2021 | Mullen et al. | |
| 11,324,981 | B2 * | 5/2022 | Kay | G07C 5/008 |
| D961,605 | S | 8/2022 | Starr et al. | |
| D990,485 | S | 6/2023 | Snover et al. | |
| D1,050,151 | S | 11/2024 | Cook et al. | |
| 2002/0091972 | A1 | 7/2002 | Harris et al. | |
| 2005/0022795 | A1 | 2/2005 | Beyer et al. | |
| 2005/0184084 | A1 * | 8/2005 | Wells | B67D 7/348 222/1 |
| 2014/0188400 | A1 | 7/2014 | Dunn et al. | |
| 2014/0350369 | A1 | 11/2014 | Budiman et al. | |
| 2015/0331963 | A1 | 11/2015 | Barker | |
| 2017/0292940 | A1 * | 10/2017 | Pandey | G06F 30/27 |
| 2018/0030937 | A1 | 2/2018 | Golladay et al. | |
| 2020/0040782 | A1 | 2/2020 | Dunn et al. | |
| 2020/0291833 | A1 | 9/2020 | Schatz et al. | |
| 2023/0186688 | A1 | 6/2023 | Hone et al. | |

OTHER PUBLICATIONS

Extended European Search Report and Written Opinion for Application No. EP 21199788.7 mailing date Feb. 14, 2022, 9 pages.

U.S. Trademark Serial No. 88424377 registered Sep. 21, 2021.

Advia Launches “All-In-One” Marketing System for Multiple Sensing at Physical Locations, by Levine, martech.org [online], published on Jun. 30, 2016, [retrieved from the Internet <URL: https://martech.org/advia-offers-new-one-digital-marketing-platform-device-multiple-sensing></URL:> (Year: 2016).

Exploring Data Visualization in Altair, by Devashree, analyticsvidhya.com [online[, published on Oct. 11, 2021, [retrieved on Apr. 17, 2025], retrieved from the Internet <URL: https://www.analyticsvidhya.com/blog/2021/10/ exploring-data-visualization-in-altair-an-interesting-alternative-to-seaborn></URL:> (Year: 2021).

Non-Final Office Action in U.S. Appl. No. 29/819,164 issued Apr. 23, 2025.

* cited by examiner

500A

| Key Issue | | | | | | | | | | |
|---|---|---|---|---|---|---|---|---|---|---|
| A | Value A | Value A | Value A | Value A | Value B | Value B | Value B | Value C | Value C | Value D |
| B | Value A | Value B | Value C | Value D | Value B | Value C | Value D | Value C | Value D | Value D |
| Score | Value E | Value F | Value G | Value H | Value I | Value J | Value K | Value L | Value M | Value N |
| Key Issue Score | Value O | Value P | Value Q | Value R | Value S | Value T | Value U | Value V | Value W | Value X |
| Key Issue Flag | Normal | Normal | Normal | Watch | Watch | Watch | Caution | Caution | Caution | Warning |

FIG. 5A

500B

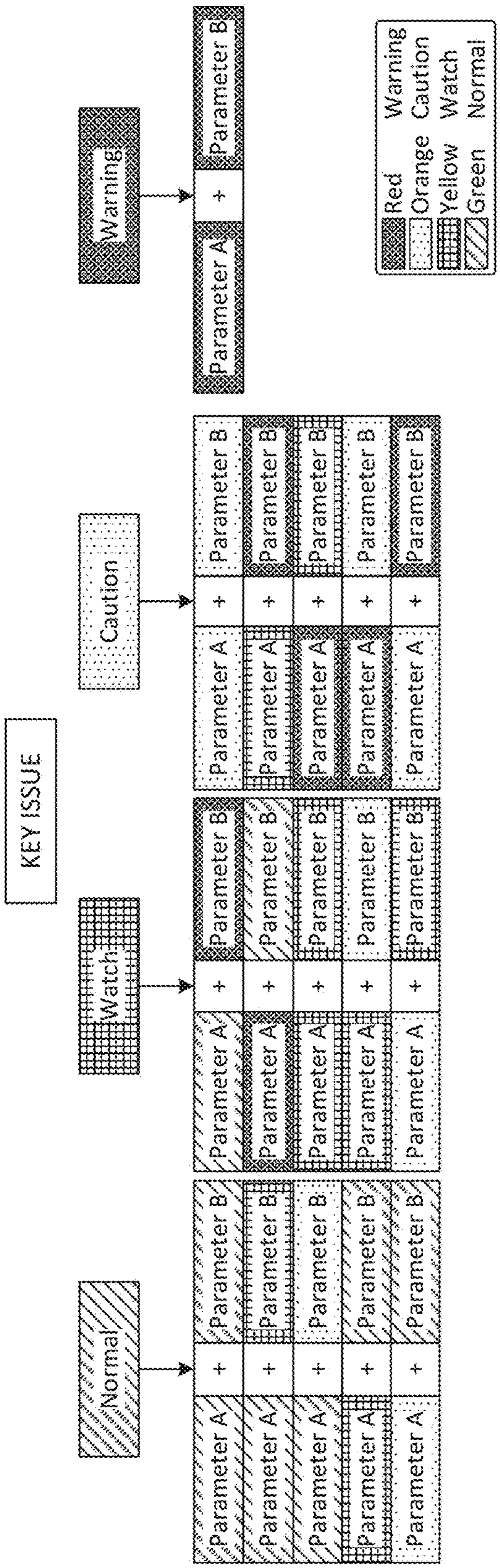

FIG. 5B

SYSTEMS AND METHODS FOR GENERATING AND PROVIDING FLUID ANALYSIS REPORTS

TECHNICAL FIELD

The present disclosure relates to improving maintenance for vehicles. More particularly, the present disclosure relates to systems and methods for generating and providing a fluid analysis report that highlights key issues to improve vehicle maintenance and performance.

BACKGROUND

Maintenance may be performed on vehicles at various time intervals. Vehicles may be taken to a service center or a repair shop for analysis, inspection, and service. The vehicle fluids may then be changed and/or analyzed to identify the condition of the vehicles. Undesirably, fluid changes (e.g., oil changes) are typically performed at predetermined distances or time intervals irrespective of the actual degradation of the fluid. This leads to unnecessary downtime and maintenance. This issue becomes compounded for fleet managers who then must manage the non-optimized costs associated with vehicle downtime and maintenance. Better systems and methods for fluid analysis are desired.

SUMMARY

One embodiment relates to a computing system. The computing system includes a processing circuit comprising one or more memory devices coupled to one or more processors, the one or more memory devices configured to store instructions that, when executed by the one or more processors, cause the processing circuit to: obtain information regarding a plurality of fluids from a plurality of vehicles; determine a plurality of thresholds based on the information regarding the plurality of fluids from the plurality of vehicles, where each threshold is specific to a fluid type of the plurality of fluids and an operating condition of a vehicle of the plurality of vehicles that yielded the information; analyze a fluid sample from a particular vehicle to identify a fluid type of the fluid sample; identify a vehicle type of the particular vehicle associated with the fluid sample; retrieve a population of the obtained information pertinent to at least one of the identified fluid type of the fluid sample or the vehicle type of the particular vehicle; retrieve at least one threshold associated with the retrieved population of the obtained information; compare a characteristic of the fluid sample to the retrieved at least one threshold; and generate and provide, responsive to the comparison, a dynamic graphical user interface to a computing device that provides information regarding the comparison along with an interactive element configured to enable a drill down of the characteristic of the fluid sample.

In some implementations, the dynamic graphical user interface includes a graph depicting values associated with the retrieved population of the obtained information. An indicator regarding the characteristic can be disposed on the graph in a visually contrasting way relative to the depicted values associated with the retrieved population. In some implementations, the processing circuit receives contact information regarding a user associated with the fluid sample. The processing circuit generates and provides a link to the dynamic graphical user interface based on the contact information regarding the user.

In some implementations, the processing circuit receives a credential for accessing the dynamic graphical user interface via the link; receives an indication of the computing device accessing the link; correlates the link to the received credential; prompts the computing device for an access credential for accessing the dynamic graphical user interface; and, provides access to the dynamic graphical user interface based on a received access credential for accessing the dynamic graphical user interface matching the received credential. The processing circuit denies access to the dynamic graphical user interface based on the received access credential being received outside a predefined time period following the prompt.

In some implementations, the processing circuit compares an identifier associated with the computing device that provides the received access credential to a stored identifier regarding the computing device and provides access to the dynamic graphical user interface based on the received access credential matching the received credential and the identifier matching the stored identifier. The fluid type of the fluid sample may be one of an engine oil, a coolant, a transmission fluid, a hydraulic fluid, or an aftertreatment system fluid. The processing circuit may command a fluid analysis device to determine a concentration of a constituent in the fluid sample.

In some implementations, the processing circuit receives the information regarding the plurality of fluids from the plurality of vehicles; categorizes the information by at least one of the fluid type, the vehicle type, and the operating condition regarding each of the plurality of vehicles; and determines a characteristic of the particular vehicle associated with the fluid sample based on the categorized information. The processing circuit can further: retrieve a maintenance action associated with the determined characteristic of the vehicle, and populate the dynamic graphical user interface with at least the retrieved maintenance action, the characteristic of the fluid sample, the information regarding the plurality of fluids from the plurality of vehicles, and the operating condition of the particular vehicle. In some implementations, the processing circuit can: retrieve a maintenance action based on at least the characteristic of the fluid sample, wherein the maintenance action includes an automatic operation of a controller of the vehicle associated with the fluid sample; provide, to the dynamic graphical user interface, at least the maintenance action and an option to implement the automatic operation; receive, from the computing device, an indication of an acceptance of implementing the automatic operation; and generate and provide, in response to the indication, a command to the controller of the particular vehicle to perform the automatic operation.

Another embodiment relates to a method. The method includes obtaining, by a processing circuit comprising one or more memory devices coupled to one or more processors, information regarding a plurality of fluids from a plurality of vehicles; determining, by the processing circuit, a plurality of thresholds based on the information regarding the plurality of fluids from the plurality of vehicles, wherein each threshold is specific to a fluid type of the plurality of fluids and an operating condition of a vehicle of the plurality of vehicles that yielded the information; analyzing, by the processing circuit, a fluid sample from a particular vehicle to identify a fluid type of the fluid sample and a vehicle type of the particular vehicle; retrieving, by the processing circuit, a population of the obtained information pertinent to at least one of the identified fluid type of the fluid sample or the vehicle type of the particular vehicle; retrieving, by the processing circuit, at least one threshold associated with the retrieved population of the obtained information; comparing, by the processing circuit, a characteristic of the fluid sample to the retrieved at least one threshold; and, generating and providing, by the processing circuit, responsive to the comparison, a dynamic graphical user interface to a computing client device that provides information regarding the comparison along with an interactive element configured to enable a drill down of the characteristic of the fluid sample.

Another embodiment relates to a processing circuit. The processing circuit includes one or more processors, and one or more memory devices coupled to the one or more processors. The one or more memory devices store instructions that, when executed by the one or more processors, cause the one or more processors to: obtain information regarding a plurality of fluids from a plurality of vehicles; determine a plurality of thresholds based on the information regarding the plurality of fluids from the plurality of vehicles, wherein each threshold is specific to a fluid type of the plurality of fluids and an operating condition of a vehicle of the plurality of vehicles that yielded the information; analyze a fluid sample from a particular vehicle to identify a fluid type of the fluid sample; identify a vehicle type of the particular vehicle associated with the fluid sample; retrieve a population of the obtained information pertinent to at least one of the identified fluid type of the fluid sample or the vehicle type of the particular vehicle; retrieve at least one threshold associated with the retrieved population of the obtained information; compare a characteristic of the fluid sample to the retrieved at least one threshold; and, generate and provide, responsive to the comparison, a dynamic graphical user interface to a computing device that provides information regarding the comparison along with an interactive element configured to enable a drill down of the characteristic of the fluid sample.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Additionally, one or more features of an aspect of the invention may be combined with one or more features of a different aspect of the invention. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIGS. 5A-B are tables showing examples of key issue scoring and categories, according to example implementations.

DETAILED DESCRIPTION

Figure 1:
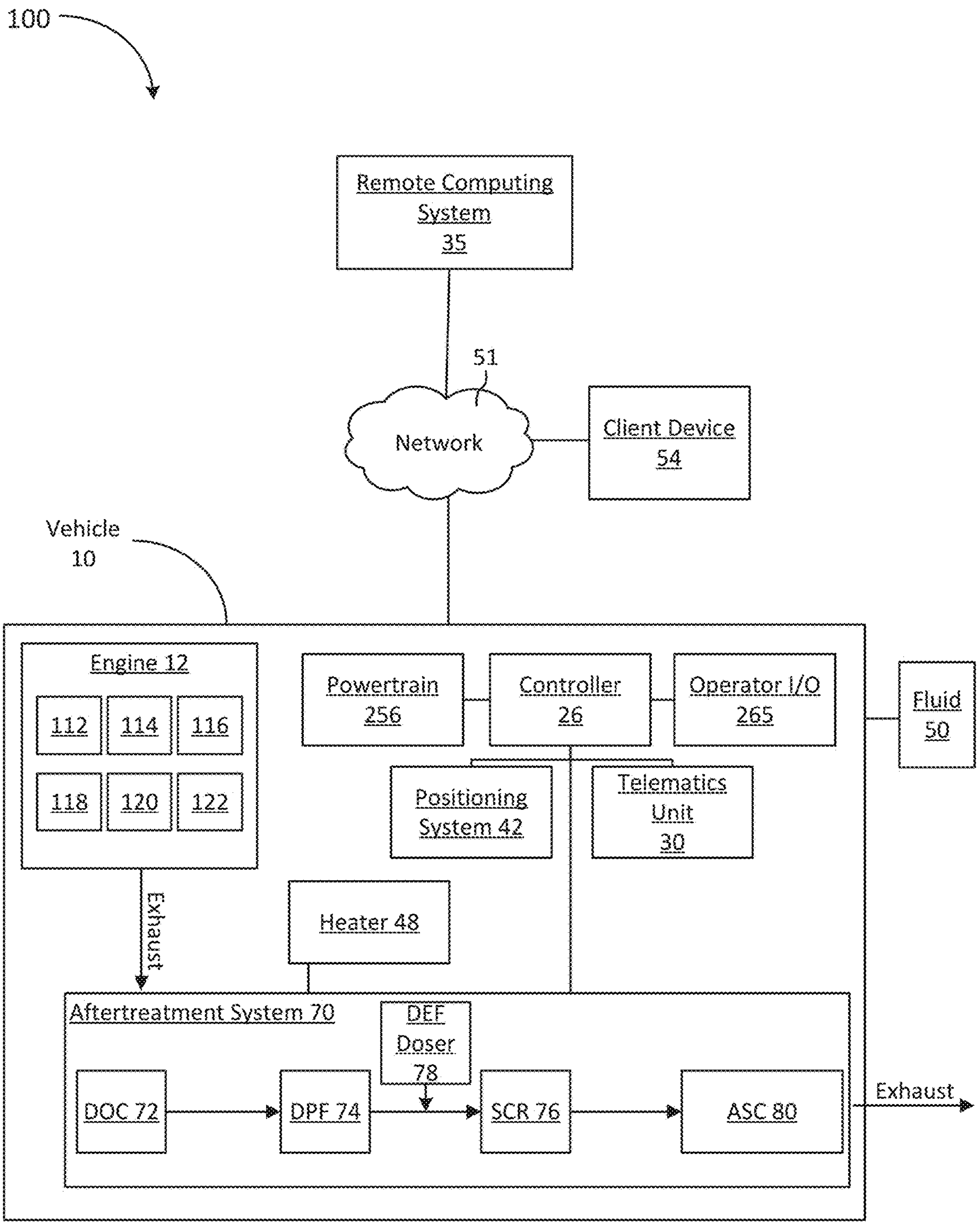
FIG. 1 is a schematic diagram of an example vehicle, according to an example implementation.

The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various implementations disclosed herein relate to systems, apparatuses, and methods for generating and providing fluid analysis reports that highlight key issues associated with an analyzed fluid or fluids. According to the present disclosure, the system can provide preventative maintenance information and fluid analysis data for various types of fluids. In operation, a user can provide or send one or more samples of fluids to a facility for testing the fluids. Once received at the facility, one or more testing devices, equipment, or tools are used to analyze the fluids. Certain tests of the fluids including equipment usage and techniques performed may be standardized by various organizations (e.g., American Society for Testing and Materials (ASTM) international).

As described herein, the system can include a processing circuit of a computing system (e.g., remote computing system or computing device). The processing circuit can include one or more memory devices coupled to one or more processors. The one or more memory devices may be configured to store instructions to perform one or more techniques for identifying, determining, obtaining, or otherwise providing a fluid analysis report that highlights one or more key issues associated with the fluid. The fluid analysis report may identify one or more parameters or characteristics associated with a fluid sample. The one or more parameters of the fluid sample (e.g., engine oil, coolant, or fuel) may be highlighted, flagged, categorized, or bucketed into different levels, groups, buckets, or categories of severity. The levels of severity may correspond to a risk level associated with a condition. For example, the severity level can include at least a normal level (sometimes color-coded as green), a watch level (sometimes color-coded as yellow), a caution level (sometimes color-coded as orange), and a warning level (sometimes color-coded as red). By flagging a group of individual parameters, the processing circuit can determine and provide a report that identifies one or more key issues corresponding to the vehicle based on the fluid analysis via grouping each parameter into an aforementioned severity level. The severity levels may correspond with color codes (e.g., for each key issue), which can easily and readily illustrate parameter categorizations in the fluid analysis report. This may enhance the visual representation or graphical user interface. The key issue may correspond to or represent one or more conditions, statuses, and/or health of at least one component of a vehicle associated with the fluid sample.

The processing circuit can transmit, send, or otherwise provide a report (e.g., fluid analysis report) to one or more remote devices, such as a client/user device or a device operated by a service center. For example, the processing circuit can provide a report with data flagged into severity levels or buckets. The report can include at least i) measurement results of parameters based on the type of fluid (e.g., individual fluids can correspond to different parameters), ii) a graphical comparison between the parameter results of the vehicle's fluid and similar fluid parameter results within a population of data, iii) analysis commentary, and/or iv) recommended actions. The population data can include a collection of historical data regarding similar fluid types, similar fluid types from similar vehicles, similar fluid types from similar engine systems, similar fluid types, similar fluid types that have experienced similar operating conditions (e.g., similar hours of operation, similar hours of operation in a similar system, etc.), etc. The population data can also include engine performance data and fluid analysis data over a period of time or other intervals (e.g., oil drains). The population data may include or indicate comparison or correlation between data from various vehicles.

The processing circuit can obtain and/or determine limits and/or thresholds for one or more determined parameters of various fluid types from the population data. For example, the processing circuit can identify different conditions of vehicles relative to certain conditions of certain parameters for certain types of fluids based on or using the population data. The processing circuit can set thresholds, limits, or ranges of severity level based on the respective conditions of vehicles compared to the measured/determined parameters. Accordingly, the processing circuit can use the thresholds to categorize key issues into different severity buckets. The key issues correspond to or are associated with various parameters of the fluid.

For each key issue (sometimes referred to as performance key issue, tag, flag, item, status, etc.), the processing circuit can assign or consider corresponding key parameters determined or measured from the fluid sample. The parameters may be weighted via a statistical detection results analysis based on a contribution level of impact on the key issue (e.g., impact on the engine or fluid system of the vehicle). The processing circuit can provide the analysis and one or more recommended action comments based on the results of flagging key issues. The comments may be predetermined for individual key issues, assigned severity buckets, or the combination of key issues and their assigned severity buckets. The comments may be updated or configured by the administrator of the processing circuit, for example. Beneficially, by having recommended actions predefined and stored in the processing circuit, the processing circuit may quickly and efficiently retrieve the predefined recommended actions from the memory in order to efficiently provide recommended actions/analysis to the user associated with the fluid sample.

The processing circuit can provide a report based on the fluid type sample. For example, the processing circuit can provide a first report for a first fluid type and a second report for a second fluid type. The processing circuit can analyze the fluid types using varying operations, techniques, or functions. The fluid type can include at least engine oil (e.g., diesel engine oil and natural gas engine oil), engine coolant, engine fuel, among other fluids.

The generated fluid analysis report can improve and facilitate the user's ability to understand critical or key issues related to the engine or fluid system of the vehicle (or other pieces of equipment that utilize the fluid) based upon data gathered during testing of the fluids associated with the population data. The report can be dynamic in nature. For instance, the report can transform or update based on at least the evolving population data over time, the sample under investigation or analysis, and the ability to analyze one or more parameters of interest to determine the severity bucket of each key issue. The report can be presented in a graphical user interface (GUI). Hence, the dynamic nature of the report can provide an improvement to the GUI. For instance, the processing circuit can improve the GUI to present the key information (e.g., key issues) in an easy to understand and quick manner. The improved GUI can enable the user to perform self-diagnostic procedures, trigger the vehicle to perform auto-diagnostic procedures, or indicate for the user to visit a service center for maintenance or repair. Accordingly, the processing circuit can reduce resource consumption, since the users can efficiently identify or obtain information as to a subsequent diagnostic step to take. The processing circuit can provide the report to a user via a client or mobile application, a web browser executing on a client device, a document electronically accessible (e.g., a PDF), a combination thereof, and so on.

In some implementations, the processing circuit can provide a selective curation of data set specific to a variety of conditions or parameters of a vehicle. The processing circuit can apply a subset of the population data in real-time to provide a more meaningful analysis of the fluid sample(s). For example, to determine a key issue (e.g., oil degradation, coolant contamination, dust contamination, etc.), the processing circuit can select a data set of similarly situated vehicles (e.g., similar engine, operating condition, terrains, climates, region, age of vehicle/engine, service cycle, etc.) from the population data. The selected data set can correspond or be referred to as representative samples of the vehicle. Using the data set, the processing circuit can provide a comparable metric reflective of the vehicle's condition. In this case, the processing circuit can dynamically adjust the time period when vehicles should perform maintenance, such as oil change, transmission fluid flush, among other checkups. In some cases, the threshold may be predetermined by the administrator. Therefore, the processing circuit can provide an individualized maintenance time frame or cycle for vehicles to reduce vehicle downtime, promote vehicle uptime, and increase the operability of the vehicle.

The different types of fluids can include at least diesel engine oil and natural gas engine oil, coolant, and fuel of vehicles. These different types of fluids can be associated with or include various parameters. For example, the diesel engine oil and natural gas engine oil can include or be analyzed based on at least (or one or more of) the oxidation, nitration, soot, fuel dilution, total acid number (TAN) (e.g., the weight (in milligrams) of a standard base, such as potassium hydroxide (KOH)), total base number (TBN), viscosity, water, Fe, Cu, Pb, Cr, Al, K, Na, Ca, Sn, Zn, Mg, P, B, Mo, Si, Mn, Ag, Ba, Bi, In, and Ni, among other elements. In another example, the coolant can include or be analyzed based on at least (or one or more of) the Percent Glycol, pH, Bromide (ppm), Chloride (ppm), Flouride (ppm), Formate (ppm), Glycolate (ppm), Molybdate (ppm), Nitrate (ppm), Nitrite (ppm), Oxalate (ppm), Phosphate (ppm), Sulfate (ppm), SCA (units/gal), Mg (ppm), Mo (ppm), Si (ppm), Pb (ppm), Ca (ppm), Zn (ppm), Fe (ppm), S (ppm), Al (ppm), B (ppm), Cr (ppm), Cu (ppm), P (ppm), Benzotriazole (BT) (ppm), Sodium Tolyltriazole (NaTT) (ppm), p-Toluic Acid (ppm), Sodium Mercaptobenzothiazole (NaMBT) (ppm), 2-Ethylhexanoic Acid (ppm), Benzoic Acid (ppm), 4-tert-Butylbenzoic Acid (ppm), Adipic acid (ppm), Sebacic acid (ppm), Dodecanedioic Acid (DDA)

(ppm), appearance, sediment, odor, and color. In further example, the fuel of the vehicle can include or be analyzed based on at least (or one or more of) the Spec Gravity, Sulfur, IR-Biodiesel, Water Content, Cetane Index, IBP (e.g., 10%, 20%, 30%, 50%, 70%, 80%, or 90%), fluid bed processor (FBP), Visc 40C cst, Iron (Fe) ppm, Tin (Sn) ppm, Lead (Pb) ppm, Indium (In) ppm, Copper (Cu) ppm, Chromium (Cr) ppm, Aluminum (Al) ppm, Molybdenum (Mo) ppm, Silicon (Si) ppm, Sodium (Na) ppm, Potassium (K) ppm, Calcium (Ca) ppm, Barium (Ba) ppm, Magnesium (Mg) ppm, Zinc (Zn) ppm, Phosphorous (P) ppm, Boron (B) ppm, Manganese (Mn) ppm, Bismuth (Bi) ppm, Nickel (Ni) ppm, Silver (Ag) ppm, flashpoint-PMCC, Cellular adenosine triphosphate (ATP), filter blocking tendency, thermal stability, and particle count.

Referring now to FIG. 1, a system 100 that includes a remote computing system 35 coupled to a vehicle 10 is shown, according to an example embodiment. The vehicle 10 includes an engine 12, an aftertreatment system 70, a positioning system 42, a telematics unit 30, a controller 26, a powertrain 256 (sometimes referred to as a powertrain system), and an operator I/O 265 (sometimes referred to as an operator I/O device). The vehicle 10 can include one or more types of fluid 50. For instance, the fluid can include at least one of an engine oil, a coolant, a transmission fluid, a hydraulic fluid, an aftertreatment system fluid (e.g., reductant), etc. The vehicle 10 can be any type of on-road or off-road vehicle including, but not limited to, line-haul trucks, mid-range trucks (e.g., pick-up trucks, etc.), sedans, coupes, tanks, airplanes, boats, and any other type of vehicle. The vehicle, in some embodiments, may also be stationary equipment that utilizes fluid (e.g., a generator or genset, etc.). Based on these configurations, various additional types of components may also be included in the system, such as a transmission, one or more gearboxes, pumps, actuators, and so on.

The engine 12 may be any type of internal combustion engine. Thus, the engine 12 may be a gasoline, natural gas, or diesel engine, a hybrid engine (e.g., a combination of an internal combustion engine and an electric motor), and/or any other suitable engine. Here, the engine 12 is a diesel-powered compression-ignition engine. The engine 12 includes a first cylinder 112, a second cylinder 114, a third cylinder 116, a fourth cylinder 118, a fifth cylinder 120, and a sixth cylinder 122 (collectively referred to herein as "cylinders 112-122"). It should be understood that, while six cylinders are represented in FIG. 1, the number of cylinders may vary depending upon system configurations and requirements. The cylinders 112-122 can be any type of cylinders suitable for the engine in which they are disposed (e.g., sized and shaped appropriately to receive pistons).

The aftertreatment system 70 is in exhaust-gas receiving communication with the engine 12. The aftertreatment system includes a diesel oxidation catalyst (DOC) 72, a diesel particulate filter (DPF) 74, a reductant delivery system 78, a selective catalytic reduction (SCR) system 76, an ammonia slip catalyst (ASC) 80, and a heater 48. The DOC 72 is structured to receive the exhaust gas from the engine 12 and to oxidize hydrocarbons and carbon monoxide in the exhaust gas. The DPF 74 is arranged or positioned downstream of the DOC 72 and structured to remove particulates, such as soot, from exhaust gas flowing in the exhaust gas stream. The DPF 74 includes an inlet, where the exhaust gas is received, and an outlet, where the exhaust gas exits after having particulate matter substantially filtered from the exhaust gas and/or converting the particulate matter into carbon dioxide. In some implementations, the DPF 74 may be omitted.

The aftertreatment system 70 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR catalyst member by a DEF doser 78 such that the SCR catalyst member receives a mixture of the reductant and exhaust gas. The reductant droplets then undergo the processes of evaporation, thermolysis, and hydrolysis to form gaseous ammonia within the decomposition chamber, the SCR catalyst member, and/or the exhaust gas conduit system, which leaves the aftertreatment system 70. The aftertreatment system 70 may further include an oxidation catalyst (e.g., the DOC 72) fluidly coupled to the exhaust gas conduit system to oxidize hydrocarbons and carbon monoxide in the exhaust gas. In order to properly assist in this reduction, the DOC 72 may be required to be at a certain operating temperature. In some embodiments, this certain operating temperature is between 200-500° C. In other embodiments, the certain operating temperature is the temperature at which the conversion efficiency of the DOC 72 exceeds a predefined threshold (e.g., the conversion of HC to less harmful compounds, which is known as the HC conversion efficiency).

The SCR 76 is configured to assist in the reduction of NOx emissions by accelerating a NOx reduction process between the ammonia and the NOx of the exhaust gas into diatomic nitrogen, water, and/or carbon dioxide. If the SCR catalyst member is not at or above a certain temperature, the acceleration of the NOx reduction process is limited and the SCR 76 will not be operating at a necessary level of efficiency to meet regulations. In some embodiments, this certain temperature is 250-300° C. The SCR catalyst member may be made from a combination of an inactive material and an active catalyst, such that the inactive material, (e.g., ceramic metal) directs the exhaust gas towards the active catalyst, which is any sort of material suitable for catalytic reduction (e.g., base metals oxides like vanadium, molybdenum, tungsten, etc. or noble metals like platinum).

The ASC 80 may be any of various flow-through catalysts, such as an ammonia oxidation (AMOX) catalyst, structured to react with ammonia to produce mainly nitrogen. The ASC 80 is structured to remove ammonia that has slipped through or exited the SCR 76 without reacting with NOx in the exhaust. In certain instances, the aftertreatment system 70 can be operable with or without the ASC 80. Further, although the ASC 80 is shown as a separate unit from the SCR 76 in FIG. 1, in some implementations, the ASC 80 may be integrated with the SCR 76, e.g., the ASC 80 and the SCR 76 can be located within the same housing. According to the present disclosure, the SCR 76 and ASC 80 are positioned serially, with the SCR 76 preceding the ASC 80.

Because the aftertreatment system 70 treats the exhaust gas before the exhaust gas is released into the atmosphere, much of the particulate matter or chemicals that are treated or removed from the exhaust gas build up in the aftertreatment system over time. For example, the soot filtered out from the exhaust gas by the DPF 74 builds up on the DPF 74 over time. Similarly, sulfur particles, which may remain in the exhaust gas as a result of incomplete combustion of fuel, accumulate in the SCR 76 and deteriorate the effectiveness of the SCR catalyst member. Further, DEF that undergoes incomplete thermolysis upstream of the catalyst may build up and form deposits on downstream components of the aftertreatment system 70. However, these build-ups on (and subsequent deterioration of effectiveness of) these components of the aftertreatment system 70 are reversible. In other words, the soot, sulfur, and DEF deposits may be substantially removed from the DPF 74 and the SCR 76 by increasing the temperature of the exhaust gas running through the aftertreatment system to recover performance (e.g., for the SCR, conversion efficiency of NOx to $N_2$ and other compounds). These removal processes are referred to as regeneration events and may be performed for the DPF 74, SCR 76, or any other component in the aftertreatment system 70 on which deposits develop.

In some embodiments, a heater 48 is located in the exhaust flow path before the aftertreatment system 70 and is structured to controllably heat the exhaust gas upstream of the aftertreatment system 70. The heater 48 may be any sort of external heat source that can be structured to increase the temperature of passing exhaust gas, which, in turn, increases the temperature of components in the aftertreatment system 70, such as the DOC 72 or the SCR catalyst member, thereby improving vehicle 10 performance while reducing fuel and DEF usage. As such, the heater may be an electric heater, an induction heater, a microwave, or a fuel-burning (e.g., HC fuel) heater. As shown here, the heater 48 is an electric heater that draws power from a battery of the vehicle 10.

A telematics unit 30 is included with the vehicle 10. The telematics unit 30 may be structured as any type of telematics control unit. Accordingly, the telematics unit 30 may include, but is not limited to, one or more memory devices for storing tracked data, one or more electronic processing units for processing the tracked data, and a communications interface for facilitating the exchange of data between the telematics 30 and one or more remote devices (e.g., the remote computing system 35). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 30 may also include a communications interface for communicating with the controller 26 of the vehicle 10. The communication interface for communicating with the controller 26 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 26 and the telematics unit 30. In other embodiments, a local area network (LAN), a wide area network (WAN), or an external computer (for example, through the Internet using an Internet Service Provider) may provide, facilitate, and support communication between the telematics unit 30 and the controller 26. In still another embodiment, the communication between the telematics unit 30 and the controller 26 is via the unified diagnostic services (UDS) protocol. All such variations are intended to fall within the spirit and scope of the present disclosure.

The positioning system 42 is configured to detect a position of the vehicle 10 at a point in time. In some embodiments, that point in time is the present moment, while in other embodiments, that point in time is upcoming and in the future. In an exemplary embodiment, the positioning system 42 is a global positioning system (GPS) in which the positioning system 42 receives GPS data from a satellite(s) and facilitates position-based communication with the satellite(s) and the controller 26. In another exemplary embodiment, the positioning system 42 is a communication system in communication with a plurality of beacons such that a position of the vehicle 10 is determined based on the position of the vehicle 10 relative to the plurality of beacons. This plurality of beacons may be towers built at certain points along roadways, existing infrastructure in place to collect tolls, or cell towers, to name but a few. Thus, the positioning system 42 may be included with telematics unit 30.

The powertrain 256 of the vehicle 10 can include an engine 12 coupled to a transmission of the vehicle 10 (among potentially other components). The transmission may be operatively coupled to a drive shaft which is operatively coupled to a differential, where the differential transfers power output from the engine 12 to the final drive (e.g., the wheels of the vehicle 10, tracks for some off-road applications) to help propel the vehicle 10. The powertrain 256 can be controlled by the controller 26 to drive the vehicle 10, such as responsive to instructions, commands, or actions by the operator. In some cases, the powertrain 256 can receive instructions from the operator I/O 265 coupled or in electrical communication with the controller 26.

In some implementations, the powertrain system 256 may include an electric motor (not shown) and/or electric motor-generator (not shown) structured to generate and provide electrical energy to one or more vehicle accessories (hence, generator) as well as to at least partly propel the vehicle. In some implementations, the motor generator may be operably coupled to the engine 12 and the transmission such that, in these implementations, the vehicle 10 is structured as a hybrid vehicle (e.g., a combination of an internal combustion engine and an electric motor or motor/generator). In still other embodiments, the engine 12 may be omitted and the vehicle is a full electric vehicle. In yet other embodiments, the vehicle 10 is structured as a plug-in hybrid vehicle, a fuel cell electric vehicle, and various other types of vehicles that utilize fluid. In some implementations, the motor generator may receive power from an energy source, such as a battery that provides an input energy to output usable work or energy to in some instances propel the vehicle 10 alone or in combination with the engine 12. In other implementations, energy may be diverted to charge the battery or any electrical powered accessories within the vehicle. The battery may be charged through regenerative braking, a fuel cell, or a combination of both.

The operator I/O 265 may be communicably coupled to the controller 26, such that information may be exchanged between the controller 26 and the operator I/O 265, where the information may relate to one or more components of the vehicle 10 or other components of the system 100 or determinations (described below) of the controller 26. The operator I/O 265 can enable an operator of the vehicle 10 to communicate with the controller 26 and one or more components of the vehicle 10 of FIG. 1. For example, the operator I/O 265 may include, but is not limited to, an interactive display, a touchscreen device, one or more buttons and switches, voice command receivers, etc. The operator I/O 265 can display a GUI to the operator (e.g., the user or the client) of the vehicle 10. The operator I/O 265 may provide one or more indications or notifications to an operator, such as a malfunction indicator lamp (MIL), etc. Additionally, the vehicle 10 may include a port that enables the controller 26 to connect or couple to a scan tool so that fault codes and other information regarding the vehicle may be obtained.

In some implementations, the operator I/O 265 can be used to provide a fluid analysis report showing key issues to the operator. The report can be presented via a GUI, which can include one or more interactive elements, buttons, or icons. The operator can interact with the one or more interactive elements of the report to update the GUI, drill down on certain aspects of the report, submit inquiries via the report (e.g., to engage with a provider of the report), and otherwise interact with the report (hence, a dynamic GUI is provided). For example, an interaction with an interactive element can generate or display a pop-up, dropdown, or decrease or increase a window size, provide additional information associated with the interactive element to the user. In another example, an interaction with the interactive element can trigger a sequence of actions to be performed by the controller 26, such as controlling one or more components of the vehicle 10. In further example, an interaction with an interactive element can initiate other actions, such as forwarding the report to another recipient (e.g., a fleet manager), redirection to a different page (e.g., web page or report page), refreshing the report page, contacting a service center, etc.

In some implementations, the vehicle 10 can include one or more fluid devices or systems 50. The fluid devices 50 may be repositories, storage containers, systems with valves and conduits (e.g., pipes, channels, etc.) for circulating one or more fluids in the vehicle. Thus, a plurality of fluids may be included in the vehicle 10 with a corresponding plurality of fluid systems 50. In operation, the controller 26 can send instructions or signals to fluid systems 50 to release, direct, or otherwise circulate fluid from the fluid devices 50 to one or more components of the vehicle 10, such as the engine 12, the aftertreatment system 70, etc. As described above, the fluid can include at least one of an engine oil, a coolant, a transmission fluid, a hydraulic fluid, an aftertreatment system fluid (e.g., reductant), and/or other types of fluids that may be included in the vehicle 10.

The fluid from the fluid systems 50 can be siphoned from or otherwise a sample removed from to be the basis for a fluid sample that is analyzed. As described herein, the fluid sample may be received by the remote computing system 35 for analysis (e.g., via a service center).

The controller 26 is coupled to the engine 12, the aftertreatment system 70, the telematics unit 30, the positioning system 42, the powertrain 256, and the operator I/O 265, among other potential components (e.g., fluid systems 50), and is structured or configured to at least partly control these systems/devices. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. In this regard, the controller 26 may be configured to receive signals, information, data, etc. (e.g., engine operating parameter signals and/or aftertreatment system operating parameter signals) from sensors such as exhaust flow rate sensors, speed sensors, pressure sensors, temperature sensors, and/or any other sensors associated with the engine 12 or the aftertreatment system 70.

As the components of FIG. 1 are shown to be embodied in the vehicle 10, the controller 26 may be structured as one or more electronic control units (ECU). As described herein, in some cases, the remote computing system 35 can transmit instructions to the controller 26 to be executed. The function and structure of the remote computing system 35 is described in greater detail in at least FIGS. 2-7.

The controller 26 may be configured to directly or indirectly transmit information, such as fluid information, and receive information from the remote computing system 35. The controller 26 may be configured for V2X (e.g., vehicle-to-everything) communications via the telematics unit 30 (e.g., direct communications with the remote computing system 35). The telematics unit 30 may also include a communications interface for communicating with the controller 26 of the vehicle 10. The communication interface for communicating with the controller 26 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one implementation, a controller area network (CAN) bus including any number of wired and wireless connections provides the exchange of signals, information, and/or data between the controller 26 and the telematics unit. In other implementations, a local area network (LAN), a wide area network (WAN), or an external computer (for example, through the Internet using an Internet Service Provider) may provide, facilitate, and support communication between the telematics unit and the controller 26. In still another implementation, the communication between the telematics unit and the controller is via the unified diagnostic services (UDS) protocol. All such variations are intended to fall within the spirit and scope of the present disclosure.

In some implementations, the controller 26 may be configured for V2X communications without the usage of a telematics unit. For example, the controller 26 may be structured to exchange information from the remote computing system 35 over a wide area network communicating directly with the vehicle 10. In other embodiments, the controller 26 may communicate with the remote computing system 35 via the telematics unit.

As shown in FIG. 1, the remote computing system 35 is in communication with the vehicle 10 and/or at least one client device 54 via a network 51. The network 51 may be any type of communication protocol that facilitates the exchange of information between and among the vehicle 10 and the remote computing system 35. In this regard, the network 51 may communicably couple the vehicle 10 with the remote computing system 35. In one embodiment, the network 51 may be configured as a wireless network. In this regard, the vehicle 10 may wirelessly transmit to and receive data from the remote computing system 35. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 26 and/or telematics unit 30 of the vehicle 10 may electrically, communicably, and/or operatively couple via fiber optic cable to the network 51 to selectively transmit to and receive data wirelessly to and from the remote computing system 35.

In some embodiments, the vehicle 10 may be a part of a fleet of vehicles. The vehicles of the fleet may have a similar or different configuration and structure relative to the vehicle 10. Each vehicle of the fleet may be coupled to the remote computing system 35. Alternatively, only certain vehicles of the fleet are coupled to the remote computing system. In some embodiments, an operator, manager, etc. of the fleet may couple to the remote computing system 35 (e.g., via one or more computing devices, such as a tablet computer, mobile smartphone, desktop computer, etc.).

The remote computing system 35 creates and curates a database of vehicle information that contains information related to vehicle performance (e.g., engine performance parameters) for the plurality of vehicles of the fleet. The database may include information specific to a plurality of routes for the vehicles of the fleet, conditions of the fluid and/or vehicle associated with certain fluid parameters, fleet information, other vehicle information, etc. The remote computing system 35 is configured to perform advanced analytics to determine and identify patterns. These advanced analytics may include Artificial Intelligence (AI), physics-based models, machine learning, etc. The determined and identified patterns may relate to repeated instances of similar parameter values (e.g., sulfur deposit amounts) for a vehicle (s) along similar routes. These patterns may be associated with a particular vehicle in the fleet, may be associated with a particular type of vehicle (e.g., vehicle with internal combustion engine that runs on diesel fuel), and/or these patterns may be associated with a particular route.

The remote computing system 35 is configured to receive data associated with the fleet (or single vehicle 10) from a database, a source, or a data repository. In one embodiment, information regarding each vehicle in the fleet is maintained by a remote computing system from the fleet (not shown). The remote computing system 35 may periodically receive fleet information from this remote computing system. In another embodiment, the remote computing system 35 periodically receives information from one or more of the vehicles of the fleet directly via the network 51. The data associated with the fleet may be a part of population data. The remote computing system 35 can use the population data for determining and setting thresholds and limits to categorize key issues associated with certain parameters of fluids into severity buckets. For example, the remote computing system 35 can compare data analyzed from a fluid sample to the population data to generate a fluid analysis report (e.g., compare or correlate data of the fleet to data of the vehicle 10). The remote computing system 35 can transmit the generated report to a client device 54 (e.g., remote from the remote computing system 35) or the vehicle 10.

In some implementations, the remote computing system 35 can identify actions to be performed based on the determined parameters of the fluid. For example, the remote computing system 35 can indicate, in the report, for the client to perform an action, such as to refill, replace, flush, or change one or more fluids of the vehicle. The remote computing system 35 may provide procedures for the client to perform the action. In some cases, the remote computing system 35 can inform the client to visit a service center, repair shop, or maintenance facility. In some cases, the remote computing system 35 can receive instructions or acknowledgment from the client to send the report to a service center. In this case, the remote computing system 35 may transmit the report to the service center, for example, selected by the client, closest to the client, or configured by the administrator of the remote computing system 35.

In some implementations, the remote computing system 35 can include and/or be coupled to various fluid testing equipment, fluid laboratory devices, or analysis tools (e.g., fluid analysis device) to analyze the fluid sample of the vehicle. The remote computing system 35 (e.g., fluid circuit 230) can cause the fluid testing equipment to perform measurements on the fluid, such as measuring concentration or parts-per-million (ppm) of individual elements of the fluid. The measurement of the elements represents the parameters of the fluid used to determine the severity of each key issue, as described in further details herein. Hence, from the fluid sample, the remote computing system 35 can identify individual elements or parameters corresponding to the type of fluid and obtain measurements of the elements.

The client device 54 (or client computing device) may be associated with a user associated with a fluid sample provided for analysis by the remote computing system 35. For example, the client device 54 can be managed or operated by an operator, manager, etc. of the vehicle 10 or other entities, such as an operator of a service center, fleet manager, etc. The client computing device 54 is configured to receive information from the remote computing system 35 and/or the vehicle 10 (e.g., from the controller 26 of the vehicle 10). The client device 54 can include at least one processor and at least one memory (e.g., one or more processing circuits). The client device 54 can include various hardware or software components, or a combination of both hardware and software components. In some implementations, the client device 54 can include features or functionalities corresponding to, as part of, or in addition to the remote computing system 35. The client device 54 can include, but is not limited to, a television device, a mobile device (e.g., a smart phone, personal computer, a laptop, etc.), a kiosk, or any other type of computing device. The client device 54 can be registered with the remote computing system 35 to receive the fluid analysis report described herein. As an example, the client device 54 can retrieve the report in an application for display via a GUI, which provides information regarding at least the comparison between the characteristics or parameters of the fluid sample to thresholds associated with the comparable population.

Figure 2:
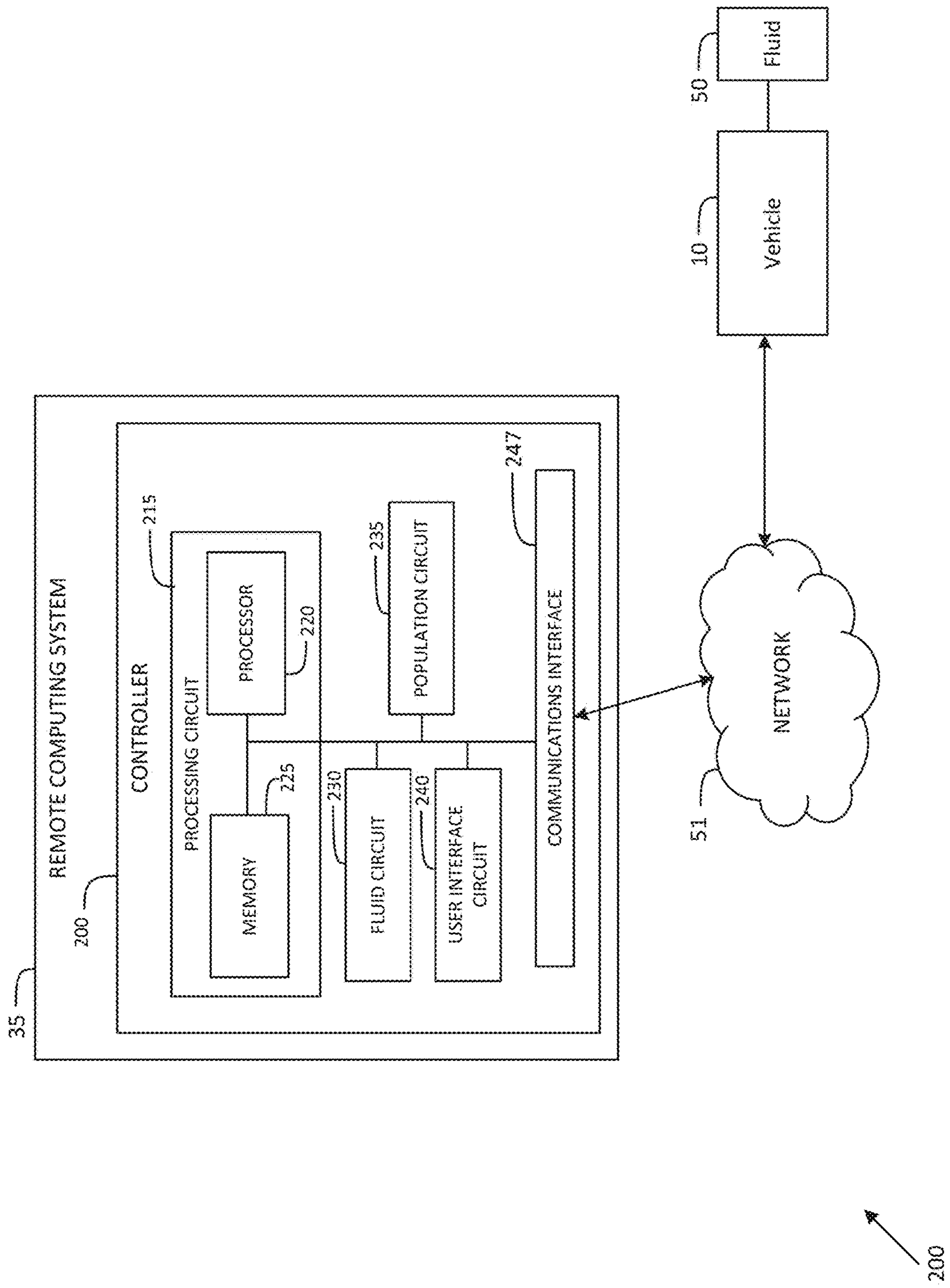
FIG. 2 is a schematic view of the example a remote computing system of FIG. 1, according to an example implementation.

Referring now to FIG. 2, a schematic diagram of the remote computing system 35 of FIG. 1 is shown, according to a more detailed view and example implementation. The remote computing system 35 can be operated by, owned by, managed by, controlled by, and/or associated with a provider entity (not shown). The provider entity may be an equipment manufacturer (e.g., engine manufacturer, aftertreatment system manufacturer, controller manufacturer, etc.), analytics provider, and, particularly, a fluid analysis provider. Thus, the provider entity may own or use a lab that has fluid analysis equipment that are coupled over a network 275 to the remote computing system 35 such that analyses of fluid samples can be provided to the remote computing system 35 in real-time or near real-time.

As shown in FIG. 2, the remote computing system 35 can include at least one controller 200. The controller 200 can include one or more circuits and at least one communications interface 247. The remote computing system 35 may be communicably coupled to the vehicle 10 or other remote devices/components (e.g., vehicle fleet or client devices) via a network 275. In some cases, the controller 200 can be configured to control the vehicle 10 or one or more components of the vehicle 10. For instance, the controller 200 can transmit instructions or signals to one or more components of the vehicle 10 for implementation. Vehicle 10 can include various fluids, for example, engine oil, engine coolant, engine fuel, among other fluids 50 (not shown). The remote computing system 35 can receive a sample of the fluid 50 (referred to as fluid sample).

Still referring to FIG. 2, the controller 200 of the remote computing system 35 is shown to include a processing circuit 215, fluid circuit 230, a population circuit 235, an user interface circuit 240, and a communications interface 247. In one implementation, the components of the controller 200 are combined into a single unit. In another implementation, one or more of the components may be geographically dispersed. In this regard, various components of the controller 200, discussed below, may be dispersed in separate devices or components of the remote computing system 35.

The communications interface 247 may include any combination of wired and/or wireless interfaces (e.g., jacks, antennas, transmitters, receivers, transceivers, wire terminals) for conducting data communications with various systems, devices, or networks.

The communications interface 247 may be structured to communicate via local area networks or wide area networks (e.g., the Internet) and may use a variety of communications protocols (e.g., IP, LON, Bluetooth, ZigBee, radio, cellular, near field communication). Furthermore, the controller 200 can use the communications interface 247 to communicate with other vehicles in the fleet of one or more vehicles. As alluded to above, the controller 200 may be used to control one or more vehicle systems by transmitting instructions from the one or more circuits to the controller 26 of the vehicle 10.

In one implementation, the fluid circuit 230, population circuit 235, user interface circuit 240, among other circuits for fluid analysis and report generation, can be embodied as a machine or computer-readable media storing instructions that are executable by a processor, such as processor 220. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple processors. In the latter scenario, the remote processors may be connected to each other through any type of network (e.g., CAN bus, etc.).

In another implementation, the fluid circuit 230, population circuit 235, or user interface circuit 240 are embodied as hardware units, such as electronic units. As such, the fluid circuit 230, population circuit 235, or user interface circuit 240 may be embodied as one or more circuitry components including, but not limited to, processing circuitry, network interfaces, peripheral devices, input devices, output devices, sensors, etc. In some implementations, one or more circuits of the controller 200 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the one or more circuits may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The one or more circuits may also include programmable hardware devices such as field programmable gate arrays, programmable array logic, programmable logic devices or the like. The one or more circuits may include one or more memory devices for storing instructions that are executable by the processor(s) of the one or more circuits. The one or more memory devices and processor(s) may have the same definition as provided below with respect to the memory device 225 and processor 220. In some hardware unit configurations and as described above, the one or more circuits may be geographically dispersed throughout separate locations in the remote computing system 35. Alternatively, and as shown, the one or more circuits may be embodied in or within a single unit/housing, which is shown as the controller 200.

In the example shown, the controller 200 includes a processing circuit 215 having a processor 220 and a memory device 225. The processing circuit 215 may be configured to execute or implant the instructions, commands, and/or control processes described herein with respect to at least the fluid circuit 230, population circuit 235, and/or user interface circuit 240. The depicted configuration represents the one or more circuits as instructions stored in a machine or computer-readable media. However, as mentioned above, this illustration is not meant to be limiting as the present disclosure contemplates other implementations where the one or more circuits can be configured as a hardware unit. All such combinations and variations are intended to fall within the scope of the present disclosure.

The processor 220 may be implemented as one or more processors, one or more application-specific integrated circuits (ASIC), one or more field programmable gate arrays (FPGAs), a digital signal processor (DSP), a group of processing components, or other suitable electronic processing components. The one or more processors may be shared by multiple circuits (e.g., the fluid circuit 230, population circuit 235, or user interface circuit 240 may comprise or otherwise share the same processor which, in some example implementations, may execute instructions stored, or otherwise accessed, via different areas of memory). Alternatively or additionally, the one or more processors may be configured to perform or otherwise execute certain operations independent of one or more co-processors. In other example implementations, two or more processors may be coupled via a bus to enable independent, parallel, pipelined, or multi-threaded instruction execution. All such variations are intended to fall within the scope of the present disclosure.

The memory device 225 (e.g., RAM, ROM, Flash Memory, hard disk storage, etc.) may store data and/or computer code for facilitating the various processes described herein. The memory device 225 may be communicably coupled to the processor 220 to provide computer code or instructions to the processor 220 for executing at least some of the processes described herein. Moreover, the memory device 225 may be or include tangible, non-transient volatile memory or non-volatile memory. Accordingly, the memory device 225 may include database components, object code components, script components, or any other type of information structure for supporting the various activities and information structures described herein.

The one or more circuits of the controller 200 can communicate with each other. The one or more circuits can perform features or operations discussed herein to generate and provide key information associated with a fluid sample to an operator.

The fluid circuit 230 is configured to receive or analyze the fluid sample (e.g., fluid 50 of the vehicle 10). The fluid circuit 230 may include or be coupled to one or more fluid analysis devices to perform analysis on the fluid sample discussed herein. The fluid circuit 230 can determine the concentration of particles associated with the fluid type of the sample, quality (e.g., color, smell, etc.) of the sample, among other characteristics or features. The fluid circuit 230 may extract or identify different types and concentrations of particles using any fluid analysis device or equipment.

The population circuit 235 is configured or structured to manage data of various vehicles including data regarding the vehicle conditions, vehicle types, historical maintenance or services performed, fluid analyses performed, and/or any other information of the respective vehicles. The population circuit 235 can identify or select data associated with a comparable population to the vehicle 10 based on information regarding at least one of the vehicle conditions (e.g., mileage, age, historical maintenance, etc.), vehicle type (e.g., made, model, etc.), fluid type, etc. The population circuit 235 may also compare fluid analysis data of the vehicle 10 to the population data of the comparable population to determine the condition of the vehicle 10 or certain key issues related to the vehicle 10.

The user interface circuit 240 is configured or structured to generate, modify, or provide a graphical user interface (GUI) to at least one of the client device (e.g., client device 54), the operator I/O 265, or other devices of the operator. The user interface circuit 240 can generate a fluid analysis report for the operator based on the characteristics or information of the fluid sample compared to data of the comparable population. The user interface circuit 240 can arrange elements of the report based on one or more desired configurations of the administrator of the remote computing system 35 or the operator. The one or more elements of the report can be interactive elements (e.g., icons, buttons, links, etc.), which can enable an operation on the vehicle 10 to be performed by the controller 26 or other components of the vehicle 10. The interactive elements can alter than appearance of the report. In some cases, the remote computing system 35 can be linked to the client device or a display of the client device 54, such that the user interface circuit 240 can signal the display device to present a GUI of the fluid analysis.

The remote computing system 35 is configured to be in communication with other remote devices, such as service center devices to relay vehicle information to facilitate services, or data centers to obtain population data of other vehicles via the network. The remote computing system 35 (or one or more circuits of the controller 200) may provide information to at least a vehicle 10 or a client device 54. The remote computing system 35 can provide information associated with a fluid sample submitted by the user, operator, or client of the vehicle 10. For example, the operator may extract a portion of one or more fluids from the vehicle 10 and submit the fluid as a sample for analysis. The remote computing system 35 can receive data (e.g., raw data) from test equipment or an operator including concentrations (ppm) of elements, the color of fluid, odor, among other parameters.

The remote computing system 35 is structured to generate a report, also referred to herein as a fluid analysis report, based on one or more fluid samples from one or more vehicles 10. The remote computing system 35 correlates data (e.g., operating condition, geographical location, brand or types of fluid and/or filters, vehicle information, among others) from the vehicle 10 to other vehicles to determine a flag for one or more key issues. The remote computing system 35 can perform certain functions or operations, such as discussed herein in conjunction with at least FIGS. 3-6, to at least process the fluid sample, correlate parameters to individual key issues, calculate a value (e.g., a score) for each key issue to assign to a bucket or severity rating or level, and generate a fluid analysis report based on these determinations.

Figure 3:
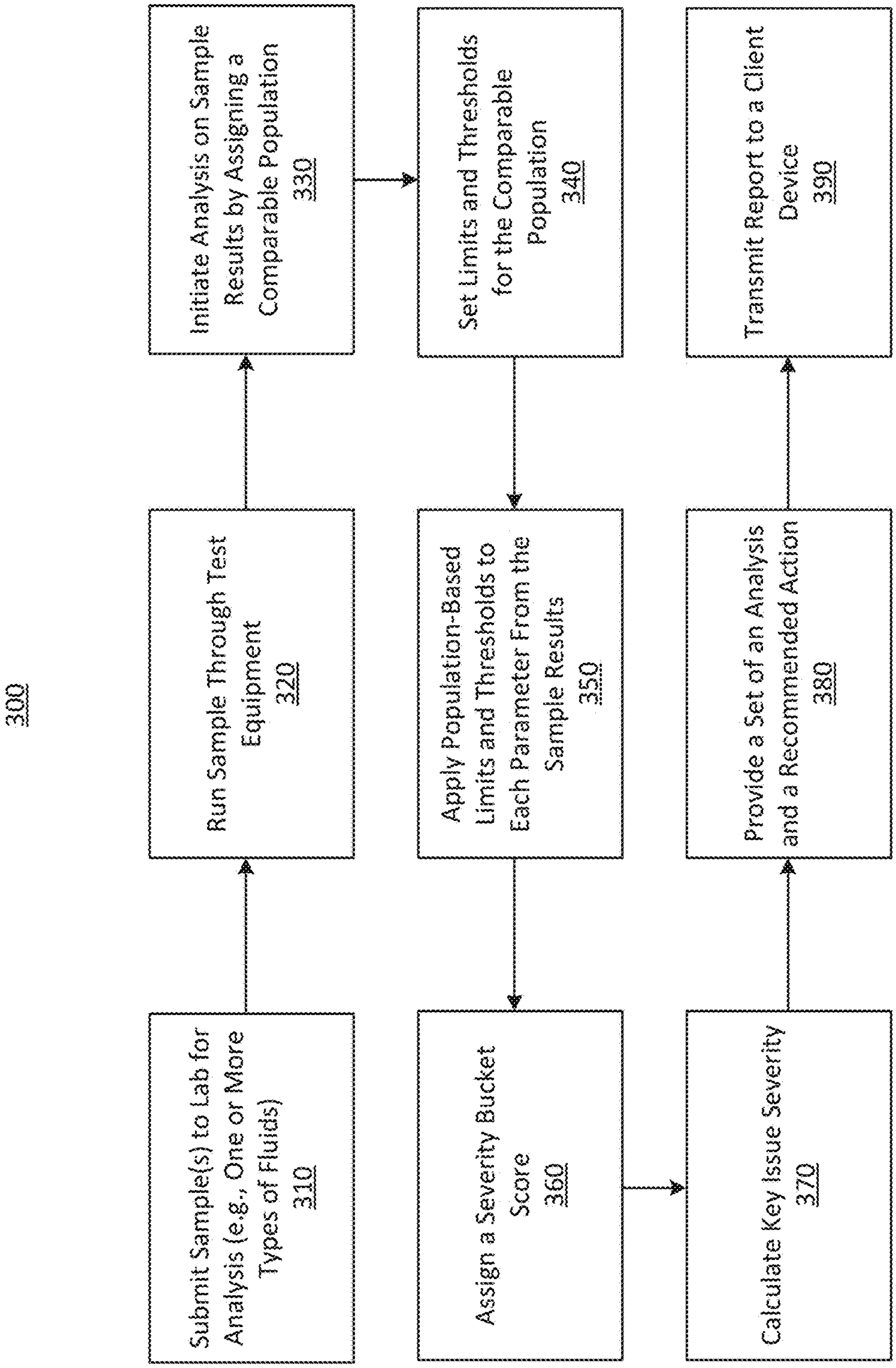
FIG. 3 is a flow diagram showing an example process flow for a fluid analysis report, according to an example implementation.

Referring now to FIG. 3, a flow diagram of a method 300 for analyzing a fluid sample and generating a fluid analysis report is shown, according to an example implementation. The method 300 can include operations performed by one or more components of at least the remote computing system 35, the vehicle 10 (e.g., controller 26), and/or client computing device. The operations of the method 300 can be performed sequentially or in different orders from the method 300.

At process 310, an operator or user obtains and submits a fluid sample to a laboratory associated with the remote computing system 35 for analysis. For example, the user can obtain a fluid sample (e.g., oil, lubricant, etc. as discussed herein). The fluid sample can include one or more fluid types, such as engine oil, a coolant, a transmission fluid, a hydraulic fluid, an aftertreatment system fluid, among other fluid types. The types of fluids submitted may be dependent on the vehicle 10. For instance, a first vehicle may include a first set of fluids, and a second vehicle may include a second set of fluids to be submitted to the lab. The first set of fluids and the second set of fluids can include at least one similar fluid type. In some cases, the first set of fluids and the second set of fluids can include a different type of fluid.

In some implementations, the client, operator, or user can enroll with a fluid analysis service provided by the provider entity associated with the remote computing system 35. For instance, the user can enroll in the service to have various fluids analyzed by the remote computing system 35 (e.g., fluid circuit 230). The user can provide fluid samples to the remote computing system 35 at various static or dynamic cycles or intervals. The cycles for fluid analysis can be based on the vehicle type and recommendation by the administrator or engineers of the remote computing system 35. The remote computing system 35 can dynamically recommend a time interval for sending fluid samples for analysis based on the historical characteristics of the vehicle 10 determined from one or more past fluid analysis results.

Subsequent to enrolling in the fluid analysis service, the user or client can provide credentials or an authentication code (e.g., passcode, etc.) to the remote computing system 35 for subscribing to the fluid analysis service. The client can use the credentials to access the analysis results or other information from the fluid analysis report. For instance, the remote computing system 35 can receive a credential from the client to access the GUI (e.g., dynamic GUI) or the fluid analysis report via a link or other mediums (operation I/O device 265 of the vehicle 10, client device 54, a combination thereof, etc.). The remote computing system 35 can receive an indication of the client (e.g., client computing device) accessing the link. The remote computing system 35 can correlate the link to the received credentials via a lookup in a database or a table stored in the memory device 225 or a data repository. The remote computing system 35 can prompt the client for credentials (e.g., access credentials) for accessing the GUI. In some cases, responsive to receiving a credential matching the credential of the link (e.g., access credential for accessing the GUI), the remote computing system 35 (e.g., user interface circuit 240) can provide the client with access to the GUI. In some cases, the remote computing system 35 may deny access to the dynamic GUI based on the received access credential being received outside a predefined time period following the prompt (e.g., 1-minute, 2-minutes, etc. after signaling to prompt the user). In some cases, the remote computing system 35 may deny access to the dynamic GUI in response to receiving a credential that does not match the access credential.

The remote computing system 35 can store, maintain, or include access credentials in a database (e.g., memory device 225). The credential can include or correspond to at least one of a pass code (e.g., alpha, numeric, alphanumeric, etc.), biometric, password, random generated code provided to the user as a result of subscribing to the service automatically stored in the database, pattern code, etc. In some cases, the remote computing system 35 can generate access credentials for the fluid analysis report. For instance, in response to generating a report for the fluid results, the remote computing system 35 can generate an access credential, which can be provided to the user via one or more configured methods or mediums (e.g., email, push notification, text, phone call, etc.). In some other cases, the remote computing system 35 can receive user-provided access credentials to access the report.

In some implementations, subsequent to the registration, the remote computing system 35 can cause a shipment of a vial to the operator. The vial may include a code (e.g., QR code, bar code, serial number, etc.) printed on the vial. A matching code may be stored in the database such that when the remote computing system 35 receives the vial from the user that contains the fluid sample, the remote computing system 35 can link or correlate the vial to the user/account. In response to the linking, the remote computing system 35 can add the results from the analysis of the fluid sample from the vial to an account accessible to the respective user.

In some cases, the remote computing system 35 can compare an identifier associated with the client computing device 54 that provides the received access credential to a stored identifier regarding the client computing device 54. The identifier may be a value (e.g., hash value, identification number, etc.), a character, a code, or other indications representing the client computing device. The remote computing system 35 can receive the identifier regarding the client computing device 54 in response to an access request from the client device 54. In response to the comparison, the remote computing system 35 can provide access to the dynamic GUI based on the received access credential matching the received credential and the identifier matching the stored identifier. In some cases, the remote computing system 35 may not immediately allow access if the identifier of the client computing device 54 does not match the stored identifier. For instance, the remote computing system 35 may transmit a notification to the registered phone number, email, etc. to confirm the client computing device identity.

At process 320, an entity associated with the remote computing system 35 (e.g., the laboratory) receives the fluid sample. With the fluid sample, the remote computing system 35 via the fluid analysis device (e.g., fluid circuit 230) obtains initial information pertaining to the fluid sample, the vehicle 10, and/or the operator, such as a date submitted, mileage of the vehicle 10, a type of filter in the vehicle 10, an oil brand, contact information of the operator associated with the fluid sample, type of fluid submitted, etc. The initial information can be from user registration with the service, the vial submitted by the user (e.g., fluid type associated with the vial), or a combination thereof. The sample can be used to determine the condition of the engine or other components of the vehicle 10. In some cases, the remote computing system 35 aggregates information including initial information from the registration process (e.g., to submit fluid sample) and measurement or analysis results from testing the fluids, among other information related to the vehicle 10. By aggregating the information, the remote computing system 35 improves the correlation between the vehicle 10 to other comparable vehicles for enhanced determination of the vehicle system or fluid health, thereby increasing the longevity of the vehicle operability.

The remote computing system 35 (e.g., fluid circuit 230) analyzes the fluid sample from the particular vehicle (e.g., vehicle 10) using test equipment or an analysis device. The remote computing system 35 analyzes the fluid sample, at least in part, to identify a fluid type of the fluid sample or a vehicle type of the particular vehicle. The test equipment can use methods, operations, or techniques configured to determine the parameters of the fluid sample. The parameters can be the output from the test equipment. The fluid analysis entity can include, link to, or be associated with the remote computing system 35 configured to receive output from the equipment. For example, parameters for the engine oil (e.g., diesel engine oil or natural gas engine oil) can include at least oxidation, nitration, soot, fuel dilution, TAN, TBN, viscosity, water, Fe, Cu, Pb, Cr, Al, K, Na, Ca, Sn, Zn, Mg, P, B, Mo, Si, Mn, Ag, Ba, Bi, In, and Ni. The parameters of the engine coolant can include at least percent glycol, pH, Bromide (ppm), Chloride (ppm), Flouride (ppm), Formate (ppm), Glycolate (ppm), Molybdate (ppm), Nitrate (ppm), Nitrite (ppm), Oxalate (ppm), Phosphate (ppm), Sulfate (ppm), SCA (units/gal), Mg (ppm), Mo (ppm), Si (ppm), Pb (ppm), Ca (ppm), Zn (ppm), Fe (ppm), S (ppm), Al (ppm), B (ppm), Cr (ppm), Cu (ppm), P (ppm), Benzotriazole (BT) (ppm), Sodium Tolyltriazole (NaTT) (ppm), p-Toluic Acid (ppm), Sodium Mercaptobenzothiazole (NaMBT) (ppm), 2-Ethylhexanoic Acid (ppm), Benzoic Acid (ppm), 4-tert-Butylbenzoic Acid (ppm), Adipic acid (ppm), Sebacic acid (ppm), Dodecanedioic Acid (DDA) (ppm), appearance, sediment, odor, and color. The parameters of the engine fuel can include at least Spec Gravity, Sulfur, IR-Biodiesel, Water Content, Cetane Index, IBP (e.g., 10%, 20%, 30%, 50%, 70%, 80%, 90%), FBP, Visc 40C cst, Iron (Fe) ppm, Tin (Sn) ppm, Lead (Pb) ppm, Indium (In) ppm, Copper (Cu) ppm, Chromium (Cr) ppm, Aluminum (Al) ppm, Molybdenum (Mo) ppm, Silicon (Si) ppm, Sodium (Na) ppm, Potassium (K) ppm, Calcium (Ca) ppm, Barium (Ba) ppm, Magnesium (Mg) ppm, Zinc (Zn) ppm, Phosphorous (P) ppm, Boron (B) ppm, Manganese (Mn) ppm, Bismuth (Bi) ppm, Nickel (Ni) ppm, Silver (Ag) ppm, flashpoint-PMCC, Cellular ATP, filter blocking tendency, thermal stability, and particle count.

At process 330, the remote computing system 35 initiates a comparative analysis in response to or subsequent to receiving the analysis of the fluid sample and/or the sample results (e.g., output from the test equipment, fluid analysis device, or fluid circuit 230). The remote computing system 35 can initiate the comparative analysis by determining or retrieving a comparable population (e.g., population data) based on the sample (e.g., by the population circuit 235). The remote computing system 35 may retrieve a population of data pertinent to at least one of the identified fluid types of the fluid sample or the vehicle type (or another parameter) of the vehicle 10. The data associated with the comparable population can be stored in the memory device 225 or a remote data repository, for example. The comparable population includes data regarding equipment and/or vehicles similar to the vehicle 10, such as similar model, age, mileage, among other conditions. In some cases, the comparable population includes data regarding similar fluid types, the brand of the one or more fluid types, geographical areas, terrains, modifications (e.g., types of tires, etc.), etc. for correlation with the vehicle 10 or the fluid sample from the vehicle 10. The remote computing system 35 uses data from the comparable population to identify one or more thresholds, limits, or ranges to set for the parameters, such as to categorize key issues into at least one severity bucket.

In one example, to identify the comparable population, the remote computing system 35 (e.g., population circuit 235) uses data associated with the vehicle 10 (e.g., initial information submitted from the user) to correlate with data of other vehicles. The remote computing system 35 identifies or detects vehicles having similar conditions or statuses as the vehicle 10, such as at least similar mileage, age, location, model, etc. In response to identifying one or more comparable vehicles (e.g., comparable population), the remote computing system 35 obtains data associated with the population (e.g., population data), such as historical measurements of parameters, historical condition of vehicle systems, among other historical data. In some cases, the remote computing system 35 determines a number of comparable items between vehicles, such as similar mileage, oil type, etc. Based on a comparable threshold, the remote computing system 35 selects a subset of vehicles as comparable vehicles to determine one or more thresholds (or ranges) for parameters or key issues. For instance, one or more thresholds associated with the comparable vehicles that are used for the parameters or key issues may be set or used as thresholds for the vehicle 10.

In some implementations, the remote computing system 35 determines various thresholds based on the information regarding fluids from the various vehicles. Each threshold may be specific to a fluid type and/or an operating condition of one or more of the comparable population of vehicles that yielded the information regarding the fluids. For example, the remote computing system 35 determines or identifies the operating conditions of the vehicles compared to the characteristics/determined parameters associated (e.g., concentration, quality, texture, color, etc.) of one or more fluid types. The remote computing system 35 sets or identifies one or more thresholds (e.g., the level or quality) for one or more characteristics of the fluid type associated with the operating condition. For instance, the remote computing system 35 identifies certain undesired characteristics (e.g., engine knocking, oil change indicator, emissions characteristics, such as high NOx amount, etc.), correlates fluid sample and vehicles, and sets fluid parameters (e.g., sulfur content, etc.) associated with the characteristic as a threshold.

At operation 340, the remote computing system 35 sets one or more limits or thresholds for the comparable population. The remote computing system 35 can use historical data of the comparable population (e.g., similar vehicles) to determine or identify flagging ranges (e.g., thresholds or limits) for the parameters of the fluid sample. Upon determining the flagging ranges, the remote computing system 35 sets the flagging ranges for the respective comparable population associated with the vehicle 10 (e.g., population of similar vehicles). Hence, the thresholds or limits may be at least a part of the population data, which can include the historical data of the comparable population.

In some implementations, the remote computing system 35 uses the historical data to identify a correlation between the measured/determined parameters and the condition of at least a part of the vehicle system of the comparable population. The condition can include, correspond to, or indicate degradation, contamination, wear, or other levels of performance/issues recorded for the vehicles (e.g., engine knocking, oil change indicator, emissions characteristics, such as high NOx amount, etc.). In other words, the determined or measured parameters can represent or indicate the condition of the vehicle systems. Further, different parameters associated with various conditions can be associated with varying ranges of concentrations (e.g., ppm) for different fluid constituents. Hence, the remote computing system 35 uses data of the comparable population to determine flagging ranges for different severities or conditions of one or more key issues (e.g., types of contamination, types of degradations, component performance, etc.) by correlating historical measurements of parameters with the corresponding historical conditions of the vehicle systems.

At operation 350, the remote computing system 35 applies population-based limits or thresholds to each determined parameter from the fluid sample. The remote computing system 35 compares one or more characteristics (e.g., parameters) of the fluid sample to at least one threshold associated with a comparable population. For example, the remote computing system 35 assigns a first set of ranges for a first parameter, a second set of ranges for a second parameter, etc. The remote computing system 35 assigns the threshold based on population data of the comparable population (e.g., similar engine information, unit information, performance characteristics, fluid information, distance information, among other information as the vehicle 10) for different types of fluids.

In further example, engine information can include the platform, build years, model years, or engine control module (ECM) models of the vehicles. The unit information can include at least chassis model year, application, transmission model year, chassis manufacturer, chassis model, transmission manufacturer, or transmission model. The performance characteristics can include at least duty cycle information (e.g., frequency of vehicle usage), horsepower rating, peak torque at RPM, fuel economy (MPG), and other indicators of performance of the vehicle. The fluid information can include at least engineering standard data (e.g., metal information), fluid grade ranges, fluid type, fluid amount (e.g., average, maximum, and minimum recommended), etc. The distance information can include at least the engine distance unit of measurement and engine distance top and bottom values. Based on at least a subset of the aforementioned information, the remote computing system 35 can select, determine, identify, or obtain appropriate flagging ranges for the parameters of the fluids.

In another example, the remote computing system 35 identifies a normal amount (e.g., ppm) for individual constituents (e.g., metals or other elements) of a fluid type indicated from the population data or from vehicle standards data (e.g., the information provided by engineers or vehicle manufacturers). Normal may correspond with predefined concentration ranges for each determined parameter, which may be specific to the age and/or other characteristics of the fluid sample. Thus, "normal" may be different based on a variety of conditions, such as characteristics of the fluid (e.g., fluid type, age, etc.), vehicle (e.g., powertrain configuration, operating conditions, etc.), and so on. The remote computing system 35 determines at least normal, watch, caution, and/or warning flagging ranges for the parameters. Although examples discussed herein provide four flagging ranges including normal, watch, caution, and warning, the remote computing system 35 can be configured to identify additional (or less) flagging ranges for scoring or assigning the parameters into buckets.

The remote computing system 35 assigns each parameter to a respective bucket or severity category. The remote computing system 35 separates the parameters into the bucket based on the flagging ranges. For example, the remote computing system 35 identifies a standard or normal value for a respective parameter. The standard value can include or correspond to an ideal metric or value to measure for the parameter. The remote computing system 35 determines a standard deviation between the measured value and the standard value. The remote computing system 35 compares the standard deviation to one or more thresholds associated with the parameter. Higher standard deviation (e.g., a greater difference from the ideal value) can indicate an abnormal level of a type of metal concentration in the fluid. For instance, the thresholds can include from zero to ±5 ppm (e.g., normal bucket), from ±5 ppm to ±10 ppm (e.g., watch bucket), from ±10 ppm to ±15 ppm (e.g., caution bucket), and beyond ±15 ppm (e.g., warning bucket). The thresholds can include different ranges depending on the parameters. The threshold can be changed or modified dynamically based on the corresponding population data. In some cases, the threshold can be configured by the administrator of the remote computing system 35.

In some implementations, each parameter can be associated with at least two sets of thresholds. The remote computing system 35 compares the measured/determined parameters with the first set of thresholds for a measured value greater than the standard value and the second set of thresholds for the measured value less than the standard value. In some implementations, the remote computing system 35 receives an indication of color, odor, or other parameters associated with the fluid. In this case, the threshold can include the degree to which the identified/measured parameter varies from the standards. For example, the standards for the fluid color can be one of at least green, orange, yellow, or turquoise, such as for engine coolant. The thresholds can include stages of color degradation (e.g., from bright to dark or dark to bright). In another example, the thresholds for odor can include deviations of magnitude or concentration from the standard odor concentration.

In some implementations, the remote computing system 35 determines different sets of thresholds for respective fluid types. For example, based on at least the population data, the remote computing system 35 determines a first set of thresholds associated with a first type of fluid and a second set of thresholds associated with a second type of fluid. The remote computing system 35 updates the set of thresholds for each fluid sample received from the operator.

In some implementations, the remote computing system 35 categorizes the information regarding the fluids of various vehicles (e.g., population) by at least one of the fluid types, the vehicle type, the operating condition, and performance of each of the vehicles. The remote computing system 35 identifies the performance of the vehicles associated with each fluid sample of the population. For example, the remote computing system 35 compares characteristics of a first fluid sample associated with a first set of population, a second fluid sample associated with a second set of population, etc. to determine the performance of the vehicle 10 based on the aggregated information of various fluid samples.

At operation 360, the remote computing system 35 assigns and/or determines a severity bucket score (value, indicator, etc.) to individual parameters. Referring to the above examples, the remote computing system 35 assigns/determines individual parameters from the fluid sample results to one of four severity buckets, such as normal, watch, caution, and warning buckets. In some cases, the buckets can be graded numerically (e.g., 1, 2, 3, and 4), alphabetically (e.g., A, B, C, D), and/or using other indications/nomenclature. The bucket can be referred to as or used interchangeably with other descriptive terms, such as a category, flag group, severity level, risk level, or key issue flag. Each bucket can be associated with a score (e.g., parameter score, parameter metric, or severity bucket score). The score assigned to the bucket can be based on at least one of the type of parameters (e.g., compound, metal, element, color, odor, etc.), the parameter's impact on a key issue, or the severity of the bucket (e.g., increment values by 5, 10, or 15 per level). The impact of the parameter on the key issue can include at least major impact and minor impact. Parameters with a major impact on the key issue can be assigned a higher score and parameters with a lower impact can be assigned a lower score, for example. For instance, the remote computing system 35 assigns a weight to the parameter based on the contribution or impact to the key issue. The weight can be adjusted dynamically based on observations from the population data (e.g., historical associations between parameters and key issues) or by engineers or administrators.

For example, the remote computing system 35 assigns a score of 80, 90, 95, and 99 for normal, watch, caution, and warning buckets, respectively. In some cases, the remote computing system 35 assigns a score of 0, 10, 15, 19 to the four bucket levels, respectively. In some other cases, the remote computing system 35 assigns a score of 10, 30, 50, 70 to the four bucket levels, respectively. The remote computing system 35 assigns a risk score to individual parameters using other scoring configurations or techniques.

The remote computing system 35 aggregates the score from one or more parameters based on the key issue. For example, the remote computing system 35 determines that parameters 1, 2, and 3 are associated with a first key issue, and parameters 2, 4, and 5 are associated with a second key issue. Accordingly, the remote computing system 35 aggregates the scores of parameters 1, 2, and 3 for the first key issue and the scores of parameters 2, 4, and 5 for the second key issue. Aggregating the score can include adding, subtracting, multiplying, averaging, or other techniques to combine multiple values.

At operation 370, the remote computing system 35 determines a key issue severity. The key issue severity can be referred to as or used interchangeably with other descriptive terms, such as key issue score or severity score. The remote computing system 35 determines the key issue score using the aggregated parameter scores. The key issue flagging (e.g., key issue bucket, flagging bucket, or flagging category) can be based on scoring ranges, such as 0 to <25 for normal, 25 to <50 for watch, 50 to <75 for caution, and greater than or equal to 75 for warning. For example, the remote computing system 35 determines a key issue for a first parameter and a second parameter. As an example, the buckets can be scored as 50, 65, 85, and 95 for normal, watch, caution, and warning. If both the first and second parameters are normal, the remote computing system 35 determines an aggregated score of 100 (e.g., first parameter (50)+second parameter (50)). To determine the key issue score, the remote computing system 35 subtracts the aggregated score with a base score, such as 100. Hence, in this example, the key issue score is zero (e.g., aggregated score (100)−base score (100)). The remote computing system 35 can flag the key issue as normal. In some other cases, the remote computing system 35 normalizes, subtracts, or otherwise cuts a portion of the aggregated score to determine the key issue score.

In another example, if the first parameter is in a watch bucket and the second parameter is in a caution bucket, the remote computing system 35 determines the aggregated parameter score of 65+85=150. If a technique for subtracting the aggregated score with the base score is used, the remote computing system 35 determines a key issue score of 150−100=50. In this case, the remote computing system 35 flags the key issue under the caution bucket. The remote computing system 35 computes the key issue score using other techniques or operations based on the parameters and weights of the parameters.

In some implementations, the remote computing system 35 determines the key issue score based on the combination of bucket types of the parameters associated with the key issue. For example, the remote computing system 35 combines bucket types of two parameters. The remote computing system 35 flags the key issue as normal based on a combination of a normal parameter and one of normal, watch, or caution parameters. The remote computing system 35 flags the key issue as watch based on a combination of i) a normal parameter and a warning parameter, or ii) a watch parameter and one of a watch or caution parameter. The remote computing system 35 flags the key issue as caution based on a combination of i) a watch parameter and a warning parameter, or ii) a caution parameter and one of a caution or warning parameter. The remote computing system 35 flags the key issue as warning based on a combination of both warning parameters. The remote computing system 35 combines the bucket types for a greater number of parameters. The remote computing system 35 can be configured with different techniques or operations for combining the bucket types, thereby resulting in different key issue flags.

In another example, the remote computing system 35 assigns the score to the parameter based on the parameter's weight and bucket type. For example, a first parameter can be weighted higher than the second parameter (or vice versa). In this example, the normal buckets for both parameters can be zero. The watch, caution, and warning buckets for the first parameter can be assigned a score of 2, 3, and 4, respectively. The watch, caution, and warning buckets for the second parameter can be assigned a score of 1, 2, and 3, respectively. The flagging range can be based on the following score: i) normal=0 to 2, ii) watch=3 to 4, iii) caution=5 to 6, and iv) warning=7 and above. Hence, the remote computing system 35 adds values corresponding to the bucket types of the parameters to determine the key issue flag, such as similar to the previous example.

In some implementations, the weight of individual parameters, flagging ranges of key issue or parameters, bucket scores, etc. respective of the key issue can be configured by administrators, experts, engineering standards, statistical analysis, among others guidelines or preferences. In some implementations, the key issue score can be adjusted in response to the aggregation of the individual parameter scores. For example, the remote computing system 35 may i) subtract, divide, or reduce the aggregated parameter score with a value, ii) increase the key issue score based on which bucket at least one parameter was assigned to, or iii) increase the aggregated score prior to calculating the key issue score.

In some implementations, certain key issues have secondary parameters contributing to the calculation/determination of the key issue score. The secondary parameters may be assigned, by the remote computing system 35, a reduced weight, which can be added to the key issue severity. In some cases, the secondary parameters can increase the overall severity of the key issue flag. For instance, if the score for a primary parameter is 50 for a certain severity, the secondary parameter can be assigned a score of 10, 20, 30, 40, or among other values less than 50. The secondary parameter can be used to update the score (e.g., parameter or key issue score indicative of the performance of the vehicle 10), where the secondary parameter can be weighted differently from other parameters (e.g., indicator parameters or major parameters).

In some cases, the remote computing system 35 applies a reduction factor to the key issue score or value. The reduction factor can reduce the overall severity of the key issue score, such as accommodating or accounting for factors not detrimental to the performance of the vehicle system. The remote computing system 35 uses the reduction factor to reduce false positive outcomes from early life break in events, among other events that may not or have negligible impact on vehicle component and/or engine performance of vehicles. For example, the remote computing system 35 utilizes or provides a reduction factor for any desired key issue. The remote computing system 35 identifies the engine age or engine mileage and the ratio between certain parameters to determine an amount to deduct from the overall key issue score. For example, the remote computing system 35 increases the reduction factor (e.g., greater deduction of the key issue score) based on a low engine age or mileage on the vehicle 10 (e.g., ages or mileages below predetermined threshold values). The remote computing system 35 decreases (or not include) the reduction factor for vehicles with high mileage or based on an aged engine (ages or mileages above predetermined threshold values). In some cases, the remote computing system 35 includes or increases the reduction factor for vehicle 10 with recently installed engine, recently replaced fluid, new filters, etc. based on maintenance information of the vehicle 10.

In another example, the remote computing system 35 increases or decreases the reduction factor based on a ratio between parameters. Depending on the fluid type, key issue, and whether the ratio is a comparison of a first parameter to a second parameter or a second parameter to a first parameter, the remote computing system 35 increases or decreases the reduction factor based on a higher ratio or a lower ratio, for example. In some cases, the remote computing system 35 may refer to the ratio to adjust the reduction factor in response to identifying an engine age or mileage below a threshold (e.g., within 1 year, 2 years, 10,000 miles, 15,000 miles, etc.). In some implementations, the remote computing system 35 includes the reduction factor for certain key issues, but not certain other key issues. In some implementations, the remote computing system 35 may or may not include the reduction factor based on the type of fluid received from the operator of the vehicle 10. In some cases, the reduction factor can reduce the weight of certain parameters, with or without reducing the overall key issue score.

At operation 380, the remote computing system 35 determines an analysis and recommended action (e.g., maintenance action associated with the determined performance of the vehicle 10). The analysis refers to an indication (e.g., comments) regarding at least one of the condition of the vehicle system (or a part of the vehicle system), explanation of each key issue (e.g., severity of engine or system failure issues), or information indicating any abnormalities of the engine or fluid system (or other vehicle systems/devices). Thus and beneficially, the analysis may include information regarding the fluid sample itself as well as information associated conditions of the source vehicle for the fluid sample. As an example, the analysis can include information regarding at least which type of key issue should be considered during vehicle maintenance, primary parameters contributing to the severity of the key issue, secondary contributing parameters, factors that deviate the parameter from the normal condition, etc. The action refers to an indication (e.g., instruction, etc.) that should be taken by the operator and/or service center personnel (e.g., technicians) to address or attempt to address the key issues and, particularly, key issues associated with at least a certain severity level such as a watch level. For instance, the action can include at least one of changing the fluid (e.g., which can be performed by the operator), visiting a service center, replacing one or more components of the vehicle 10, flushing or cleaning at least one component, or other vehicle maintenance or repair actions. In some cases, the remote computing system 35 provides multiple recommended actions, some of which may be optional or alternative choices.

The analysis and action can be based on at least the key issue severity score (e.g., the assigned severity bucket) and the parameter score. The remote computing system 35 aggregates or accounts for multiple key issues and the parameters to generate or formulate the analysis and action. In some cases, the analysis and action can be retrieved from a database based on the severity of key issues and parameters. The analysis and action may be configured by experts, administrators, or engineers based on the statistical analysis or engineering standards to resolve engine failures, performance issues, or other vehicle system errors, for example.

In some implementations, the analysis and recommended action may be template language that the remote computing system 35 retrieves from the memory. In some cases, the remote computing system 35 receives custom analysis or actions from the administrator or a remote device. In some other cases, the remote computing system 35 uses a machine learning engine or technique to generate custom analysis and action for the operator. The analysis can be in any format. For example, the remote computing system 35 provides analysis with format: "[key issue] resulting from [parameter 1] [parameter 1 status] and [parameter 2] [parameter 2 status] and . . . [parameter n] [parameter n status]. [key issue] [A description outlining an explanation for the flagging of the key issue]." Further analysis comments may be provided for parameters related to key issues depending on their severity. For example, additional analysis comments may be provided for key issues with warning severity, and may not be provided for key issues with normal severity.

Hence, the outputs or results from the fluid analysis can be taken in their raw form and transformed or converted into a process, such as transforming the raw data into a set of analysis and recommended action that is easily readable by the operator to at least self-diagnose, perform maintenance procedures on the vehicle, or take the vehicle 10 to a service center. Therefore, the remote computing system 35 provides the analysis and actions for the operator to take any maintenance action, thereby extending the operability of the vehicle 10, reducing downtime, and increasing uptime of the vehicle 10.

In some implementations, the remote computing system 35 correlates at least a soot value, oxidation, nitration, fuel dilution, among other parameters to a type of key issue or contamination. For example, the remote computing system 35 identifies, determines, or otherwise makes a connection between the parameter to at least one type of key issue based on historical data of comparable population (e.g., population data). Certain parameters can be presented in one type of fluid and not other types of fluids, for example, Hence, based on the results from the fluid analysis (e.g., parameter measurement) and the type of fluid analyzed, the remote computing system 35 identifies a set of key issues for the particular type of fluid, which can be reflected in the analysis and recommended action to provide to the operator. In some cases, the remote computing system 35 correlates data between different types of fluids (e.g., parameters of various fluids) to provide analyses or actions to take based on the combination of analysis on the fluid types.

In some implementations, the number of actions or analyses can be based on the severity of the key issues. For example, if the key issues are assigned to a normal severity bucket, the remote computing system 35 provides an analysis indicating a normal operating status. Further, the remote computing system 35 provides an action indicating to resample fluid or perform vehicle inspection at a normal or extended time interval (e.g., 1-month, 6-months, 1-year, or 2-years cycle). In further example, if three key issues are assigned to one of a watch, caution, or warning severity bucket, the remote computing system 35 provides three individual analyses on the three key issues and one or more actions to maintain the vehicle 10 based on the key issues. Higher severity values can indicate that urgent action should be taken for the vehicle 10. Ranking of low to high severity can include normal, watch, caution, and warning, in the examples provided herein, where high severity indicates a higher risk. Therefore, the remote computing system 35 provides a number of analyses and recommended actions based on the severity of individual key issues (or parameters).

In some implementations, the remote computing system 35 provides the analysis and actions based on the combination of flags regarding the different types of fluids. For example, the remote computing system 35 identifies multiple key issues assigned to at least a watch bucket. The remote computing system 35 links all the fluid types (e.g., combining dust contamination, soot contamination, fuel contamination, and degraded oil), parameters, and key issues associated with the fluid types. Based on the combined/correlated information, for example, the remote computing system 35 provides an analysis in view of the combination of all key issues. Further, the remote computing system 35 provides a recommended action based on the combination of the key issues severities.

In some implementations, the maintenance action includes an automatic or nearly automatic operation of a controller of the vehicle 10 associated with the fluid sample. The remote computing system 35 retrieves a maintenance action based on at least the characteristic of the fluid sample and transmits the instruction (action) to the controller 26 of the vehicle 10 over the network. The remote computing system 35 performs an automatic or nearly automatic operation based on the recommended action and permission from the user. The automatic or nearly automatic operation can include at least one of running the engine 12 at predefined operating points (e.g., torque, speed, power, etc.), performing an active regeneration event for the aftertreatment system 70, recalibrating one or more sensors on the vehicle 10, etc. In some cases, prior to initiating the automatic or nearly automatic operation, the remote computing system 35 checks for one or more conditions of the vehicle 10 to be met, such as the engine 12 is ON, vehicle 10 is in park, operator approval, etc. The remote computing system 35 provides, to the dynamic GUI, at least the maintenance action and an option (e.g., an interactive element) to implement the automatic operation. The remote computing system 35 may receive an indication of accepting implementation of the automatic operation. Accordingly, the remote computing system 35 generates and provides a command to the controller 26 of the vehicle 10 to initiate or perform the automatic operation in response to the indication from the user.

At operation 390, the remote computing system 35 generates and provides a report to at least one of the client computing device 54 or the vehicle 10 (e.g., the display device of the vehicle 10). In one embodiment, the report or fluid analysis report is configured as a dynamic GUI provided on the client device, in the vehicle 10 (e.g., via a display device), or via another electronic display means. In some cases, the remote computing system 35 provides the report via email, text message with a link to the report, or other channels. In some cases, the remote computing system 35 provides the report to a service center selected by the operator or to a service center identified as closest to the location indicated by the operator (e.g., based on GPS coordinates of the vehicle 10 relative to GPS coordinates of service centers nearby). That way, if the recommended action is severe (e.g., see technician for immediate servicing), the technician or service center may receive the fluid analysis report in advance so that the technician can readily get started on triaging/servicing the vehicle.

The report can include at least the analysis or result data of the fluid sample, recommended action, population data, a listing of key issues, flags of the key issues (e.g., color-coded or marked), summary user/operator information, fluid and filter information, sample information, a summary of oil health, and metal information. For example, the remote computing system 35 populates the GUI with at least the retrieved maintenance action (e.g., recommended action), the characteristic of the fluid sample (i.e., determined parameters), the information regarding the fluids from the plurality of vehicles, the operating condition of the particular vehicle, etc. In some cases, the report can include engine maintenance score (e.g., how well fluid has been managed), fluid performance (e.g., fluid condition or fluid grade), or other information relevant to the maintenance of the vehicle 10. The remote computing system 35 publishes or provides the report to an application (e.g., user portal, website, or data source), such that the client device given valid credentials can access, review, and download the report.

In some implementations, the report (e.g., the GUI) can include interactive elements to enable a drill down (e.g., additional information) of the characteristics of the fluid sample or other information of the analysis results. The interactive elements can enable the operators to trigger one or more actions or operations within the report. For example, icons associated with the key issues, analysis, recommended actions, etc. can be interactive, thereby enabling a pop-up or dropdown menu to provide operators with additional information associated with the icons. Additional information may include an increased size of a portion of the report (e.g., increasing the size of a graph, metal information, etc.). Further, additional information can include causes contributing to the degradation of at least the engine and the fluid system of the vehicle 10, for example.

In some implementations, the report can include a reply or feedback element. For example, in response to an interaction with the reply element, the application executing on the client device 54 can display a window for the operator to type a response and send the message. In this case, the client device 54 can transmit a message to the remote computing system 35 or other remote devices servicing operators. In some cases, the client device may transmit a message to a service center device to schedule a visit, request information, or receive assistance. In this configuration, the fluid analysis report is an interactive report that includes messaging/conversation capabilities (e.g., over the network, via a telephone network, a combination thereof, etc.).

In some implementations, the client device 54 and the controller 26 of the vehicle 10 can be linked. The report can include a script or code to instruct or initiate a command for the vehicle 10. For example, the client device 54 can receive an indication of interaction from the operator to initiate a recommended action. In response to the interaction, the remote computing system 35 provides a confirmation screen prior to starting the operation. Upon receiving a confirmation, the client device 54 and/or remote computing system 35 can transmit instructions to the controller 26. The actions to be performed by the controller 26 can include but are not limited to, implement an active filter generation; increase, decrease, or otherwise modulate an engine RPM, torque, power output, etc.; increase, decrease, or otherwise modulate a temperature of a vehicle system; and/or other actions to address one or more key issues or contamination as recommended by the remote computing system 35.

In some implementations, the report can include a map. The map can include at least the location of the operator, the vehicle, or a location provided by the operator when sending the fluid sample. The map can include one or more locations of service centers near the operator or the service center preferred/selected by the operator. In some cases, the report may include an indication of parameters used to grade the key issue score. The key issue can be color-coded based on the assigned severity bucket, such as for operator's readability. For example, green may represent normal severity, yellow can represent watch severity, orange can represent caution severity, and red can represent warning severity. The color-codes can be configured by the administrator of the remote computing system 35 or based on preference by the user. In some cases, the map can be interactive. The map can include at least a summary of the service center (e.g., review, rating, cost, etc.), a navigation icon, a trigger to send the report to the service center (e.g., recommended action can be used by the service center for diagnosing the vehicle 10), among others. Accordingly, the remote computing system 35 provides fluid analysis data with key issues to the user to inform the user of the vehicle condition and actions to upkeep the vehicle 10.

In some implementations, the GUI of the report includes a graph depicting values associated with the retrieved population of the obtained information (e.g., population data). The GUI includes an indicator regarding the characteristic of the fluid sample disposed visually on the graph in a visually contrasting way relative to the depicted values associated with the retrieved population. For instance, the GUI provides the population data in a light tone and the characteristics of the fluid in a contrasting dark tone, and vice versa, to emphasize the characteristics of the fluid while presenting various other data. In some cases, the GUI includes options to configure the visual clarity or setting for user customization.

In some implementations, the remote computing system 35 generates and provides a link to the dynamic GUI to the contact information (e.g., email, text, device identifier, etc.) of the user. The remote computing system 35 provides the user with access to the GUI in response to valid credentials received from the user or denies access in response to invalid credentials. In some cases, the remote computing system 35 may be set up with two-factor authentication (e.g., by the administrator or client). In this case, the remote computing system 35 sends a second factor (e.g., notification, alert, or prompt) to the client computing device 54 for confirmation prior to granting access. In some other cases, the second factor corresponds to the client computing device identifier (e.g., MAC address, serial number, etc.), such that the client computing device 54 identifier and the credential must match the stored information before access is granted.

Figure 4:
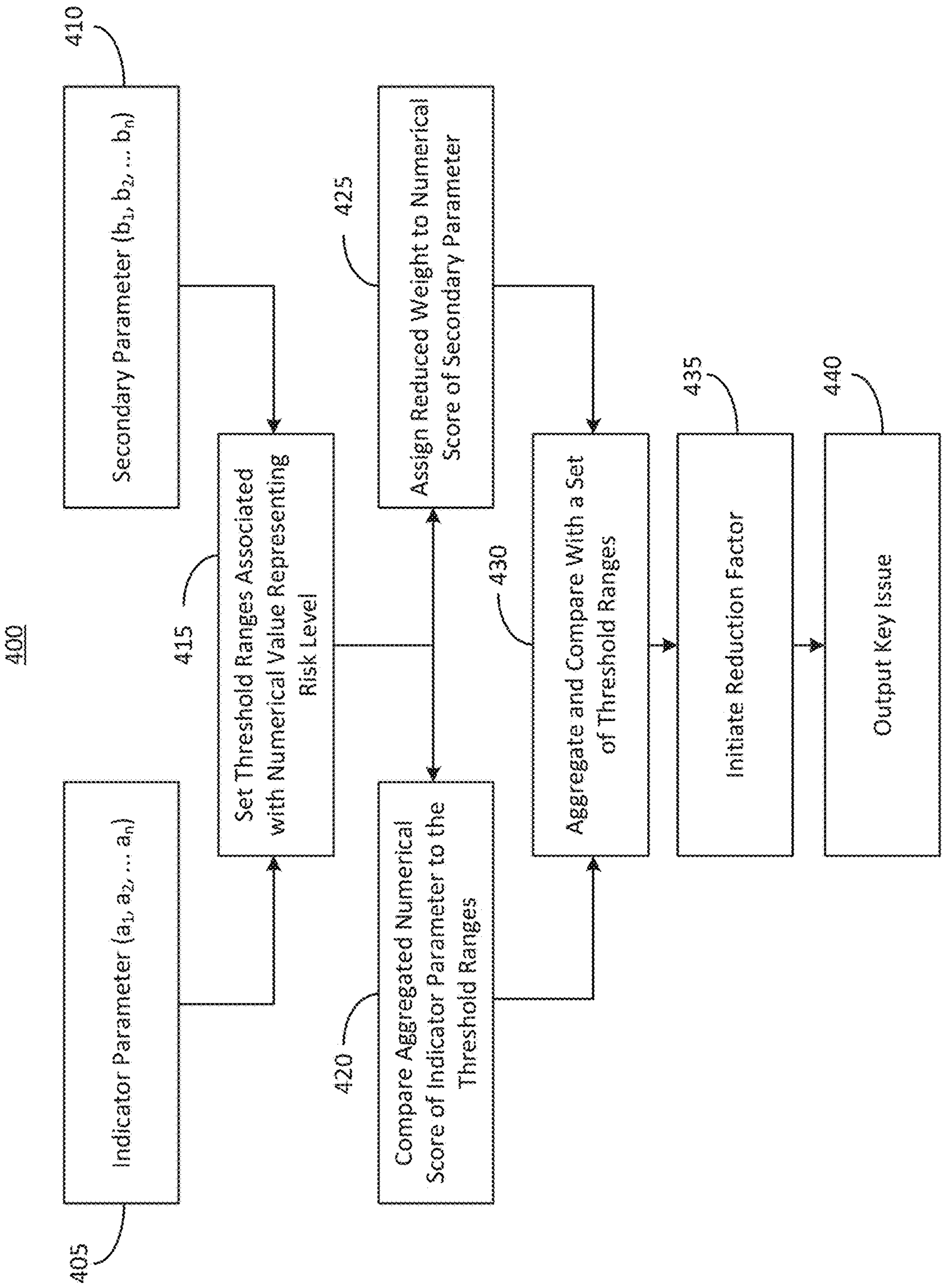
FIG. 4 is a flow diagram showing an example process flow for a key issue, according to an example implementation.

Referring to FIG. 4, depicted is a flow diagram showing an example process flow 400 for determining a key issue, according to an example implementation. The process flow 400 can include operations performed by one or more components of at least the system 100, the remote computing system 35, the vehicle 10, or the remote computing system 35 in conjunction with various components from FIGS. 1-2. One or more operations of the process flow 400 can include, correspond to, or be a part of certain operations of the process flow 300, such as in conjunction with FIG. 3. For example, a remote computing system 35 performs operations to determine key issue outcomes (e.g., severity bucket associated with individual key issues). The operations of the process flow 400 can be performed sequentially or in different orders.

At operation 405, the remote computing system 35 determines the indicator parameters (sometimes labeled as $a_1$, $a_2$, . . . , $a_n$). The indicator parameters may also be referred to as or are used interchangeably with other descriptive terms, such as primary parameters, first set of parameters, major parameters, or indicator factors. The indicator or primary factors refer to one or more parameters categorized as having a higher contribution (e.g., 90%, 70%, 60%, etc.) in representing the health of certain vehicle system/device and/or changes in key issue severity. The remote computing system 35 selects one or more indicator parameters from the results of the fluid sample. The results can include all, one, or a subset of parameters associated with the fluid sample. The remote computing system 35 uses the population data to select the indicator parameters. For example, based on data from the comparable population, the remote computing system 35 identifies one or more parameters having the most (e.g., primary) impact on certain contaminations, degradations, or other key issues. With one or more parameters identified, the remote computing system 35 assigns the same one or more parameters from the fluid sample results as indicator parameters.

At operation 410, the remote computing system 35 identifies secondary parameters (sometimes labeled as $b_1$, $b_2$, $b_n$). The remote computing system 35 identifies secondary parameters in similar manner as identifying or selecting the indicator parameters. The secondary parameter may also be referred to as or are used interchangeably with other descriptive terms, such as a secondary factor, minor parameters, or second set of parameters. The secondary parameters or factors refer to one or more parameters having a predetermined range or level of contribution to the health of the vehicle system, which may be less than the indicator (e.g., 10%, 20%, 30%, etc. contribution). The secondary parameter may be relevant to determining the severity of the key issue, with less impact on changing the severity bucket based on the results or measurement of the secondary parameter. The second parameter can be weighted less than the indicator parameter. For example, with one indicator parameter and one secondary parameter, if the indicator parameter is assigned to a normal bucket and the secondary parameter is assigned to a caution bucket, the remote computing system 35 assigns the key issue to a normal bucket. If the indicator parameter is assigned to a watch bucket while the secondary parameter is assigned to a normal bucket, the remote computing system 35 assigns the key issue to a watch bucket. In further example, having severe secondary parameter results can change the severity of the key issue. If the indicator parameter is assigned to a normal bucket and the secondary parameter is assigned to a warning bucket, the remote computing system 35 assigns the key issue to a watch bucket, for example.

The condition of vehicle components (or certain vehicle components or vehicle systems) may be represented by/based on the measurement results of the individual fluid types. The results from analyzing each fluid type can include various parameters. The remote computing system 35 assigns or associates a group of parameters to one or more key issues. Therefore, each fluid type can correspond to a group of key issues (e.g., quality of fluid can indicate certain contaminations, degradations, or wear in the engine or fluid system.

For example, the key issues for diesel engine oil can include at least a coolant contamination value, dust contamination value, a soot contamination value, a degraded oil value, fuel contamination value, and/or an engine wear value. The key issues for natural gas engine oil can include at least a coolant contamination value, a dust contamination value, a water contamination value, a degraded oil value, and/or an engine wear value. The key issues for engine coolant can include at least a degraded coolant value, an excessive contamination value, a system corrosion value, and/or a hard particle value. The key issues for diesel fuel can include at least a fuel cleanliness value, a sulfur content value, a bacteria content value, a trace metals value, a degraded fuel value, and/or a fuel characteristics value. The key issues may be added, removed, or configured for certain types of fluid. One or more parameters can be assigned individual key issues as indicator parameters or secondary parameters.

At operation 415, the remote computing system 35 sets threshold ranges for at least parameters, aggregated parameter scores, or key issues. The remote computing system 35 determines the threshold ranges to set based on the population data of comparable vehicles. In some cases, the remote computing system 35 sets the threshold ranges based on instructions from data scientists, engineers, or administrators. Each threshold range can be assigned a numerical value representing at least normal, watch, caution, or warning. For example, the remote computing system 35 scores parameters within i) a normal range as 80 points, ii) a watch range as 90 points, iii) a caution range as 95 points, and iv) a warning range as 99 points. Other point metrics (e.g., scoring system or values) can be assigned for the threshold ranges. The secondary parameters may be assigned less points for individual threshold ranges.

At operation 420, the remote computing system 35 compares an aggregated numerical score or value of indicator parameters to the threshold ranges. For example, the remote computing system 35 adds the scores of indicator parameters to determine an aggregated indicator parameter score. The remote computing system 35 compares the aggregated score to a set of ranges that represent the different severities. Similarly, at operation 425, the add the scores of the secondary parameters to obtain an aggregated secondary parameter score. The remote computing system 35 assigns the secondary parameter with reduced weight to a severity bucket. Accordingly, the remote computing system 35 determines the severity of indicator parameters and secondary parameters associated with the key issue.

At operation 430, the remote computing system 35 adds the scores or values of the indicator parameters and the secondary parameters to determine an aggregated parameter score. In some cases, adding the parameter scores may include or correspond to combining the severities of the indicator parameters and the secondary parameters. The remote computing system 35 subtracts or normalizes the aggregated score based on at least the number of parameters (e.g., indicator parameter or secondary parameter) and the score associated with individual buckets for the parameters. In response to the normalization or subtraction, the remote computing system 35 determines the key issue score, which is based on the aggregated score of the parameters.

The remote computing system 35 compares the aggregated score or the key issue score to a set of ranges. Depending on the range the key issue score falls under, the remote computing system 35 assigns or sets the respective key issue to one of the severity buckets. In some cases, the remote computing system 35 uses numerical values to determine the severity of the key issue based on combinations of parameter scores. The scores associated with buckets for the parameter can be represented as grades A, B, C, D, etc., the color green, yellow, orange, red, etc., or 1, 2, 3, 4, etc., for example. The remote computing system 35 combines different grades, colors, or other characters or values to determine the key issue flag (e.g., combine parameter flags to obtain a key issue flag).

At operation 435 and in some embodiments, the remote computing system 35 initiates or uses a reduction factor on the key issue score (e.g., a first key issue score or an initial key issue score). The remote computing system 35 uses the reduction factor to reduce false positive outcomes, such as false positives on the final risk level of the key issue provided to the operator. In response to including the reduction factor, the remote computing system 35 reduces the overall severity of the key issue. In some cases, the reduction factor may reduce the severity of the key issue by more than one severity level. For example, the reduction factor can reduce the severity (or risk level) from watch to normal, from caution to watch, from caution to normal, from warning to caution, from warning to watch, among others. A higher reduction factor can increase the reduction of the severity, as an example.

The reduction factor can be a value to subtract, divide, or otherwise reduce the key issue score. The remote computing system 35 determines the reduction factor based on at least the respective key issue under analysis and certain early life events of components (e.g., recently replaced, restored, repaired, or cleaned components of the vehicle 10, such as engine, filter, oil, among others). For example, if the oil was recently replaced, the remote computing system 35 determines that it may be unlikely for oil to be degraded. Hence, the remote computing system 35 includes (or increases) the reduction factor for the degraded oil key issue. In another example, if the engine has recently been replaced, the remote computing system 35 can include a reduction factor for engine wear key issue.

In some implementations, the remote computing system 35 may not include (or decrease) the reduction factor based on the aging of the engine, filter, fluid, or other vehicle components associated with one or more key issues. The magnitude of the reduction factor can be dependent on the historical events of the vehicle 10, such as aging, repair, or maintenance cycles of the vehicle 10. In some cases, the remote computing system 35 determines a reduction factor based on the population data.

In some implementations, the reduction factor can be based on the ratio between at least two parameters. For example, the parameters that are compared by the remote computing system 35 to obtain the ratio are determined based on at least one of trending data analyses from fluids sampling (e.g., predicted or subsequent condition(s) of fluids based on the various fluids sampling), and engineering standards of one or more products, parts, and/or fluid composition. The remote computing system 35 is configured to determine the ratio based on the trend between the parameters. In a further example, the remote computing system 35 calculates or determines the ratio between the parameters based on the results from the fluid analysis. In certain scenarios, if the ratio is within the bounds (e.g., thresholds, ranges, etc.) set or predetermined by at least one of a standard, an operator, etc., the remote computing system 35 may remove or subtract off the reduction weight from the score (e.g., not include the reduction weight). In other scenarios, if the ratio is outside of the bounds, the remote computing system 35 may not remove the reduction weight from the score (e.g., maintain the reduction weight). In some cases, other reduction weights may be added based on unit distance, fluid distance, or other conditions.

At operation 440, the remote computing system 35 outputs or provides the key issue outcome (e.g., the severity or risk of the key issue). The remote computing system 35 provides the outcome of the key issue to the client device via a report. In some cases, the remote computing system 35 provides the key issue score as part of the outcome. In some other cases, the remote computing system 35 may not provide the numerical score and present the severity of the key issue in a certain code (e.g., color-code) or character (e.g., letter or number representing the risk level). The remote computing system 35 outputs the key issue in response to, for example, adding the parameters scores and comparing the aggregated score to a set of ranges. In another example, the remote computing system 35 outputs the key issue in response to initiating the reduction factor on the key issue score.

Referring generally to FIGS. 5A-B, depicted are tables 500A-B showing examples of key issue scoring and categories, according to an example implementation. The tables 500A-B provide example combinations of parameter scores or parameter severities and the resulting key issue severity. The example combinations of at least one of tables 500A-B can be used by, for example, at least the remote computing system 35. For instance, the remote computing system 35 can use the example combinations of parameter scores or buckets of tables 500A-B to calculate, determine, or otherwise assess the risk level of individual key issues, such as in the process flow 300 or process flow 400 in conjunction with at least FIGS. 3-4.

Referring now to FIG. 5A, in further detail, table 500A can include a first parameter (e.g., parameter A), a second parameter (e.g., parameter B), an aggregated score, a key issue score, and a key issue flag. The first parameter and the second parameter can be one of any parameter results from the fluid sample analysis based on the fluid type. The first parameter or the second parameter can be a part of the indicator parameter, the secondary parameter, or a combination of both the indicator parameter and the secondary parameter. In some implementations, the table can include additional parameters, such as a third parameter, fourth parameter, etc.

The aggregated score can be an aggregate (or sum) of the scores associated with the parameters. The remote computing system 35 can determine or calculate the key issue score based on at least the aggregated score. In some cases, the remote computing system 35 can calculate the key issue score in response to applying a reduction factor to reduce the aggregated score. In some other cases, the remote computing system 35 can apply the reduction factor in response to determining the key issue score. The reduction factor can be based on at least the population data and the vehicle condition (e.g., age or mileage of the engine, filter, or other components).

The remote computing system 35 can compare the key issue score to a set of ranges (e.g., thresholds or limits). In response to the comparison, the remote computing system 35 can set a key issue flag. In this case, the flag can be one of normal, watch, caution, or warning. In some cases, the flag can include no severity, mild severity, moderate severity, or high severity, for example. The flag can be represented by color. For example, red can represent warning, orange can represent caution, yellow can represent watch, and green can represent normal, as in at least FIGS. 5-7. The representation of the key issue flag, bucket, risk level, or severity level can be configured or modified by the administrator of the remote computing system 35.

It should be understood that in other embodiments, other visually contrasting indicators may be used to indicate key issue flags or severity levels. For example, while different color variations are shown in the FIGS. 5-7, in other embodiments, different severity levels may be shown by different fonts (e.g., darker/larger font sizes for more severe issues), one or more of the key issues may blink or flash (in this instance, the GUI is a dynamic GUI and one or more of the "Issue 1-6" at the top of FIG. 7A, for example, may blink or flash to draw the attention of the operator), a pop-up may overlay the rest of the report to list (e.g., in a table format) the issues with severity levels above a predefined threshold, and/or other ways to visually illuminate the fluid sample analysis and severity level determinations. In some embodiments, an audio component may also be provided. For example, the Key Issues boxes may include a link that, when selected, cause an audio output to describe the determined key issues.

It should also be understood that while the Key Issues are shown as boxes at or near the top of the report in FIGS. 5-7, in other embodiments, there may be fewer or more boxes, the position of the boxes on the GUI may change (e.g., at the bottom of the GUI, on the left and/or right side of the GUI), the relative size of the boxes may change (e.g., boxes with severity levels above a Warning level may be relatively larger than boxes below this threshold thereby drawing an operator's attention to these key issues), and/or the boxes may change in shape (e.g., circles, ovals, pie chart, graphs, etc.). Additionally, the placement of the legend (e.g., red—warning, orange-caution, etc.) may be positioned in other positions on the GUI, be of a different size, include fewer or more components, and otherwise be adjusted from what is depicted.

The remote computing system 35 can subtract or reduce the aggregated score to determine the key issue score. In some cases, the remote computing system 35 can subtract the score using a baseline score (e.g., score when all parameters are normal condition or value set by the administrator). In some cases, the aggregated score can be an average between the parameter scores, wherein the remote computing system 35 can determine a deviation from the average. In this case, the remote computing system 35 can compare the deviation to a threshold to determine the key issue flag.

In some implementations, the remote computing system 35 can determine the key issue score dynamically (e.g., not subtracting a static value from the aggregated score). As a first example, the remote computing system 35 can compute an aggregated score of 170 for a first parameter in a normal range and a second parameter in a watch range. The remote computing system 35 may subtract 170 with a first value (e.g., 160) to obtain a key issue score of 10. In a second example, the first and second parameters may be in a watch range, with an aggregated score of 180. In this example, the remote computing system 35 may subtract the aggregated score with a second value (e.g., 155) less than the first value or increase the total key issue score after subtraction with the first value. The remote computing system 35 may dynamically change the subtraction value based on the severity of each parameter or the combination of parameters. Hence, the remote computing system 35 can determine the key issue score dynamically based on the combination of parameters, rather than static adding and subtracting of parameter scores.

Further examples of the dynamic nature for determining the key issue score can be shown in at least table 500A. In some implementations, the key issue score for key issues can be determined using various different scoring techniques. In some cases, the aggregated score (e.g., an initial score) is converted to a new value or value range to allow all (or some) of the key issues to have the same base number (e.g., as more parameters are added, the initial score increases). The aggregated score is converted by the remote computing system 35 to the key issue score based on, for instance, personalized or desired risk evaluation (e.g., how to risks are evaluated) configured by the operators, administrators, engineers, etc. For example, an aggregated score of 175 can be achieved from the combination of 80+95=175, which may be assigned to a score of 20, resulting in a "Normal" classification. In some cases, when converting the aggregated score of 175 to the key issue score, the remote computing system 35 can assign a respective key issue score a value of 25, for instance, if the configuration by the operator indicates that the combination produces or results in a "Watch" flag/classification. Hence, the remote computing system 35 provides tailored outcomes to produce accurate key issue flag severity based on configurations by the administrators, for example.

Referring now to FIG. 5B, in further detail, the outcome of the key issue can be based on the combination of parameters' severities. The combination of parameters can be weighted differently to produce a desired key issue outcome. For example, to obtain a normal severity for two parameters, both parameters can be normal or one of the parameters can be normal and the other can be either watch or caution severity. In another example, to obtain a watch severity, i) one parameter can be normal and the other can be warning severity, ii) both parameters can be assigned to a watch severity, or iii) one of the parameters can be assigned to watch severity and the other assigned to caution severity. Examples of different combinations of parameters can be depicted in table 500B. The outcome of the combinations can be configured by the administrator or adjusted based on the evolving population data.

In some implementations, the remote computing system 35 can include a secondary parameter or a secondary weighting in response to determining a first key issue outcome. The secondary parameter can be combined with other parameters used to obtain the key issue outcome. In some cases, the secondary parameter can combine with a first key issue outcome to produce a second key issue outcome. Subsequent to adding the secondary parameter, the remote computing system 35 may increment or move the key issue severity to a higher level depending on the severity of the secondary parameter. The secondary parameter can be added to the key issue outcome resulting from the combination of parameters, such as in tables 500A-B. An example of adding a secondary parameter can be shown in conjunction with at least FIG. 6.

Figure 6:
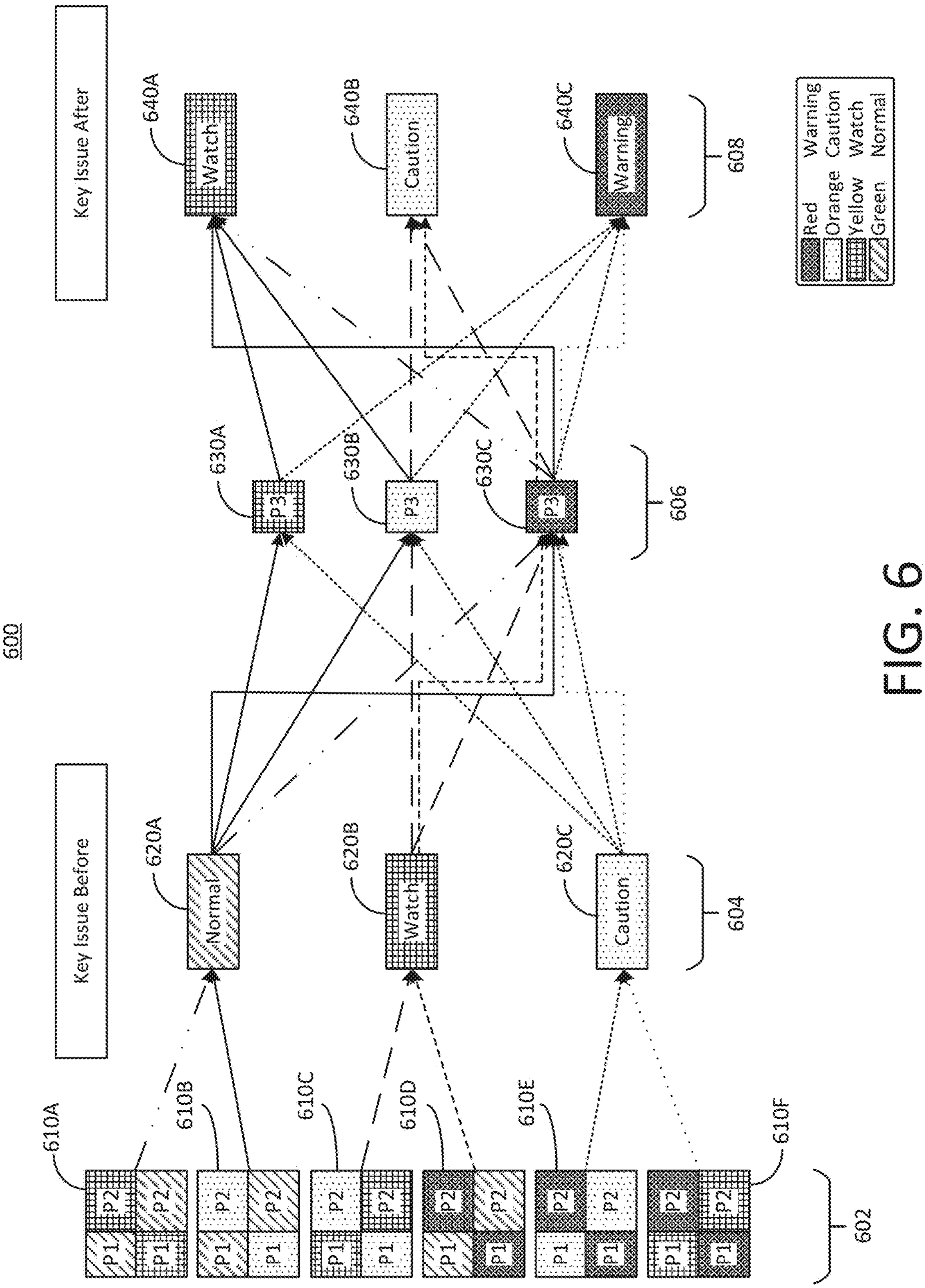
FIG. 6 is a flow diagram showing an example of categorizing a key issue, according to an example implementation.

Referring now to FIG. 6, depicted is a flow diagram 600 showing an example of categorizing a key issue, according to an example implementation. The flow diagram 600 can include various combinations of parameters (602), a first key issue outcome (sometimes referred to as a first key issue severity) (604), a secondary parameter added or combined to the first key issue severity (606), and a second key issue outcome (sometimes referred to as a second key issue severity) (608). The P1 and P2 included in (602) can represent a first parameter and a second parameter. The P1 or P2 can be a part of the indicator parameters (e.g., primary parameters). In some implementations, the P1 or P2 can be a part of secondary parameters.

Individual combination block (e.g., each of 610A-F) can represent two combinations of the parameters. For example, for block 610A, a first combination of normal P1 and watch P2 or a first combination of watch P1 and normal P2 can output a normal key issue severity 620A. Similarly, the combinations of block 610B can output the normal key issue severity 620A. The combinations of parameters of block 610C or block 610D can output a watch key issue severity 620B. The combinations of parameters of block 610E or block 610F can output a caution key issue severity 620C. Other combinations of parameters (or with additional parameters) can be included (not shown), such as to produce one of or other key issue severities.

The flow diagram 600 includes mappings of parameters in combination with a secondary parameter that leads to a change in the key issue outcome. The first key issue outcome (604) can be combined with the secondary parameter (606). The second key issue outcome (608) can be based on the combination of the first and second parameters (602), the first key issue outcome (604), and the secondary parameter severity (606). Depending on the severity of the first and second parameters at (602), combining the first key issue outcome (604) with the secondary parameter (606) can output a different second key issue outcome (608).

For example, the normal key issue severity 620A can combine with one of at least a watch, caution, or warning parameter (e.g., a third parameter or a secondary parameter 630A-C). If block 610A is used to determine the normal key issue severity 620A, combining block 620A with any secondary parameter (606) can result in a change of severity to a watch key issue severity 640A. In another example, if block 610B is used, combining block 620A with block 630C can change the severity of the key issue to the watch key issue severity 640A. Further, if block 610B is used, combining block 620A to one of blocks 630A-B may not change the severity of the key issue (e.g., remained at normal key issue severity).

In another example, the key issue severity of block 620B based on block 610C can combine with secondary parameter 630B or 630C to obtain a caution key issue severity 640B. The key issue severity of block 620B based on block 610D can combine with secondary parameter 630C to obtain the caution key issue severity 640B. The key issue severity of block 620C based on block 610E can combine with any secondary parameter (606) (e.g., one of secondary parameter 630A-C) to obtain a warning key issue severity 640C. The key issue severity of block 620C based on block 610F can combine with secondary parameter 630C to obtain the warning key issue severity 640C. In some implementations, the results from combining the key issue before (604) to one of the secondary parameters (606) using various combinations of parameters can be modified by the administrator of a remote computing system 35 (e.g., processing circuit) used to generate the key issue outcome. Certain mappings of parameters combinations (602) combined with at least one secondary parameter (606) to obtain a final key issue outcome may not be shown in flow diagram 600. For instance, the certain mappings may result in multiple increments of severity changes (e.g., from normal to caution, from watch to warning, etc.) or may not result in a change of severity from the key issue before (604) to the key issue after (608).

Referring to FIGS. 7A-G, depicted are illustrations showing examples of fluid analysis reports 700A-G, according to an example implementation. The reports 700A-G can be generated by one or more components of at least the system 100, the remote computing system 35, or the remote computing system 35 in conjunction with other devices. The reports 700A-G can be generated using one or more operations of the process flow 300, 400, or 600, in conjunction with at least FIGS. 3, 4, and 6. For example, a remote computing system 35 can perform one or more operations to generate the reports 700A-G that includes various elements, features, or interfaces.

The remote computing system 35 can provide one or more devices with access to the report 700A-G, such as client device 54, one or more components (e.g., controller 26, vehicle system, etc.) of the vehicle 10, or a device of a service center validated to receive the report 700A-G. For example, the client device 54 (or other devices) can access, review or download the report 700A-G via email, website, client portal, application, among other mediums. The remote computing system 35 can modify the appearance (e.g., arrangements, number of, or types of elements) of the report 700A-G based on at least one of the configured preferences by the client via application settings, default interface configuration, the type of fluid sample, or results from the analysis. The remote computing system 35 can generate a customized or personalized report 700A-G with different appearances for individual clients based on the results of the fluid sample submitted, for example. In some cases, certain portions of the report 700A-G can be generated using a template. In some cases, the remote computing system 35 can generate portions of the report 700A-G dynamically based on at least the lab results, the evolving population data, and computed results. The computed results can include at least the parameter severities, key issue severities, combinations of parameters associated with the respective key issue, or combinations of key issues used for determining the analysis or recommendation to provide, for example.

Figure 7A:
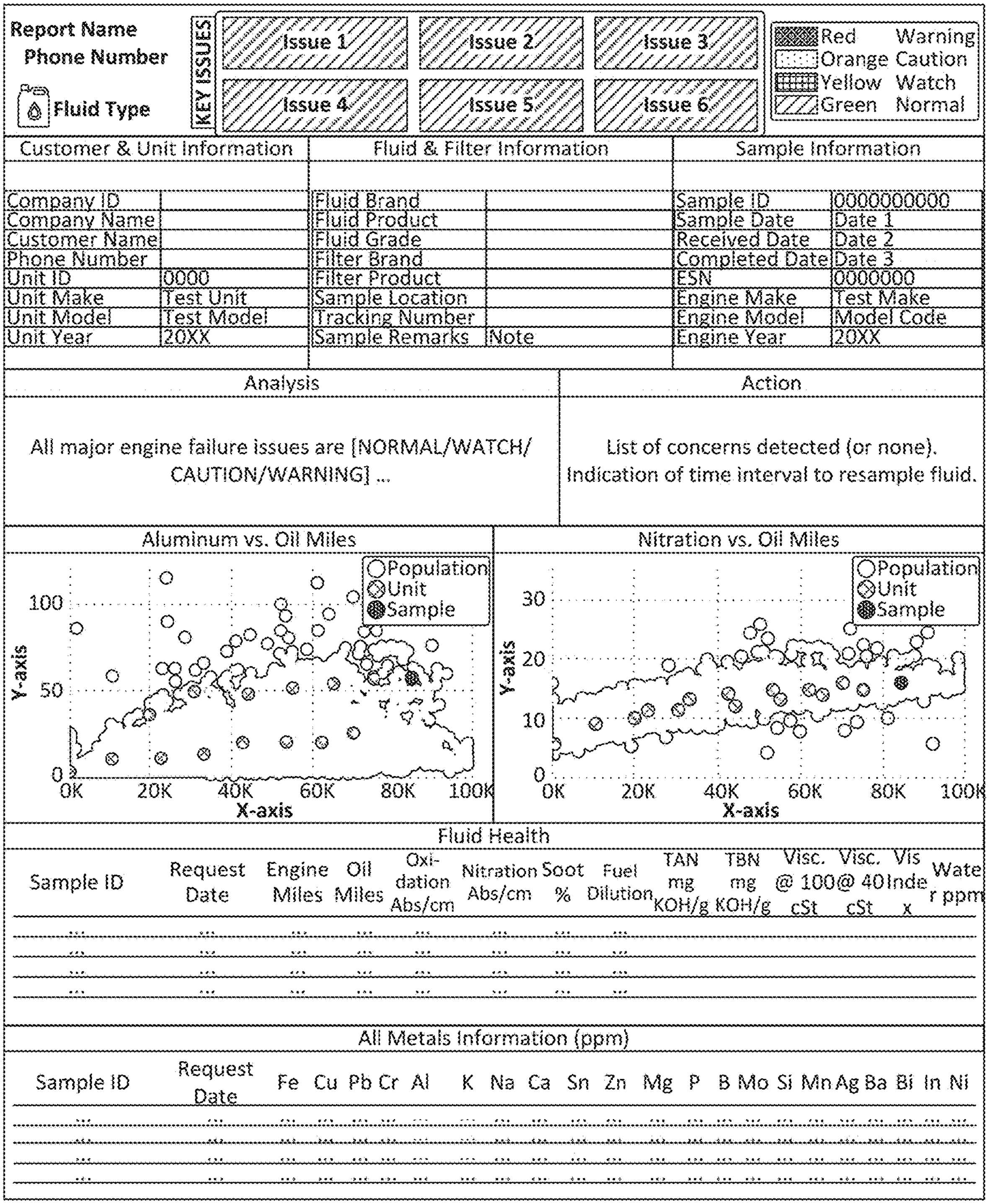
FIGS. 7A-G are illustrations showing examples of fluid analysis reports, according to example implementations.
Figure 7B:
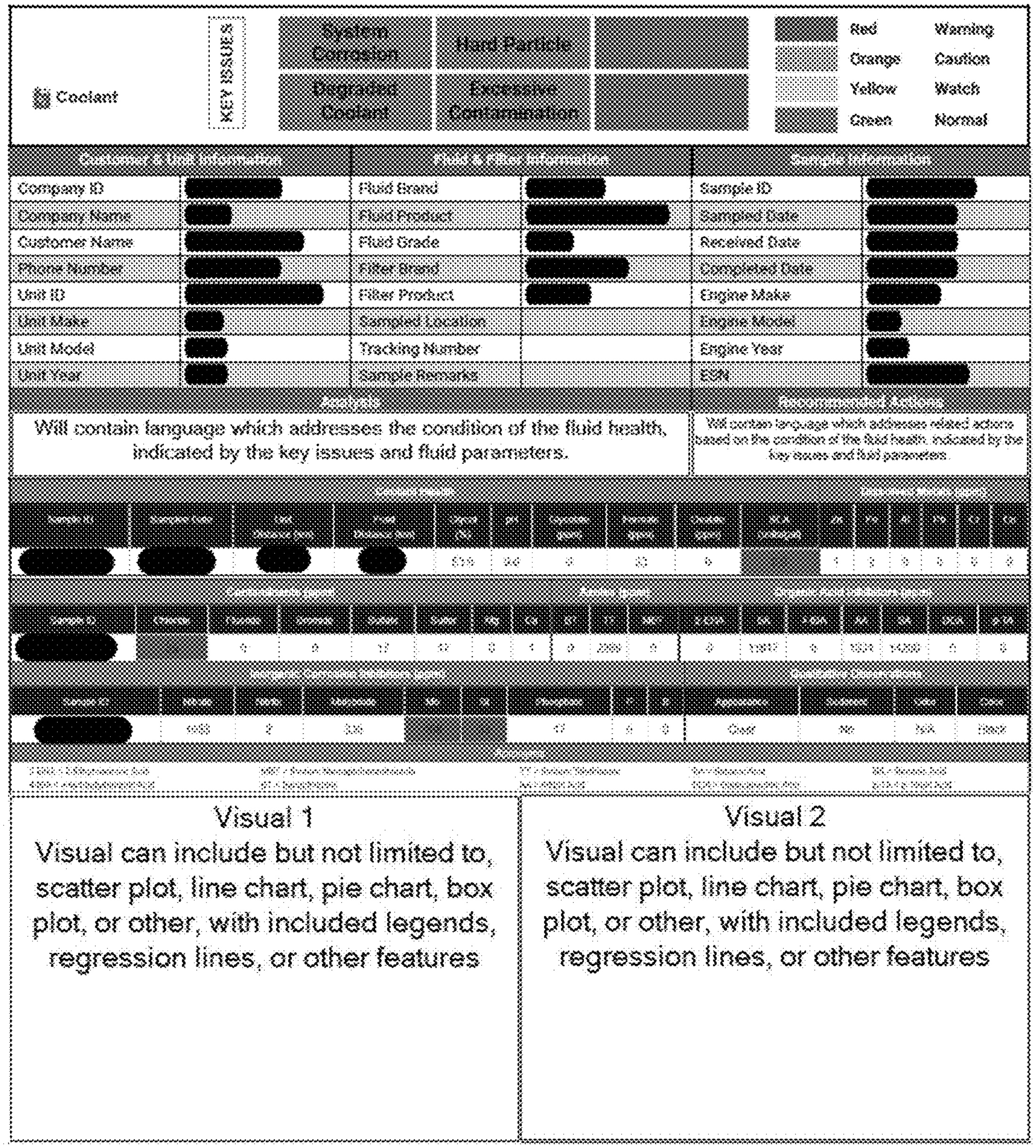
Figure 7C:
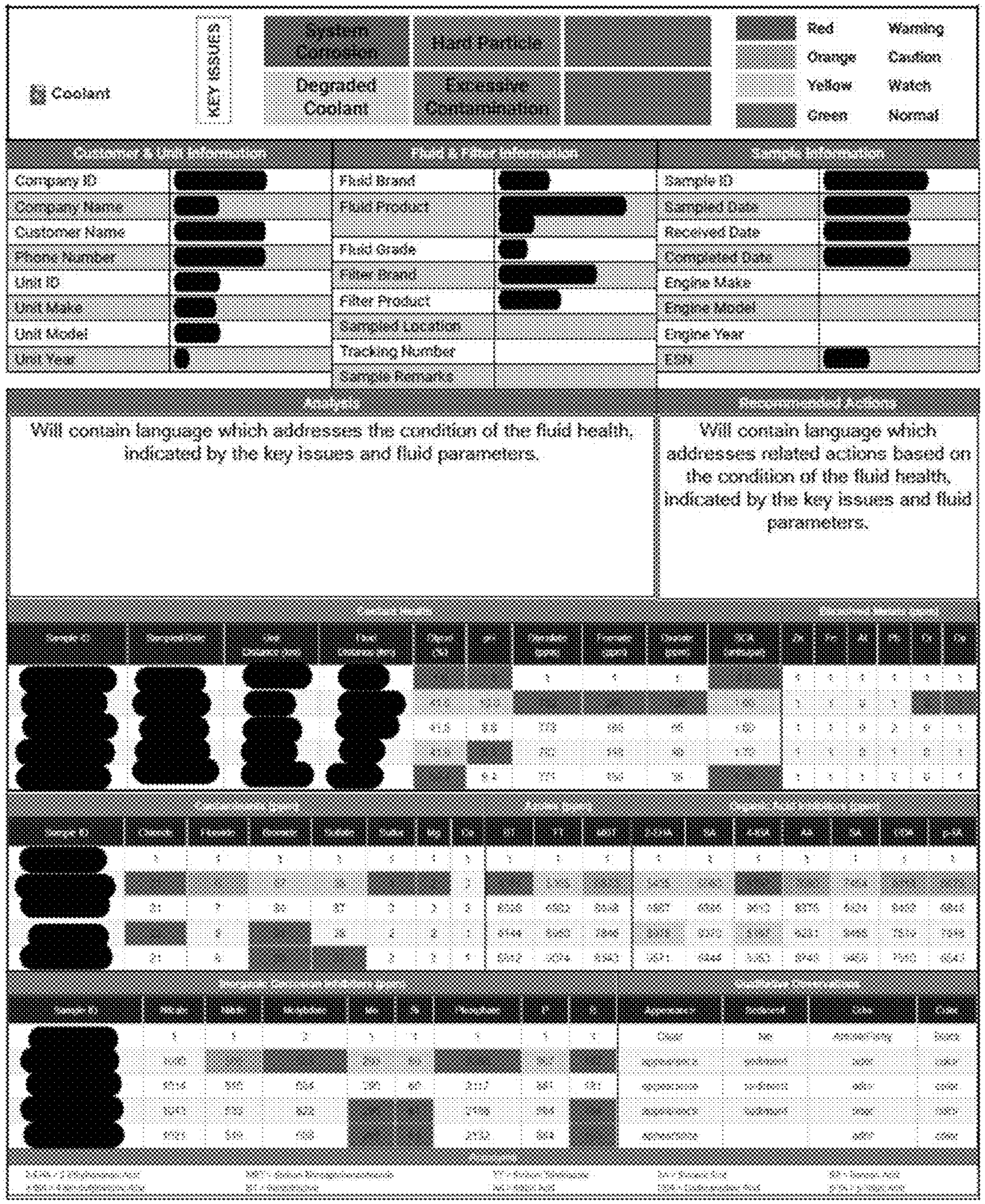
Figure 7D:
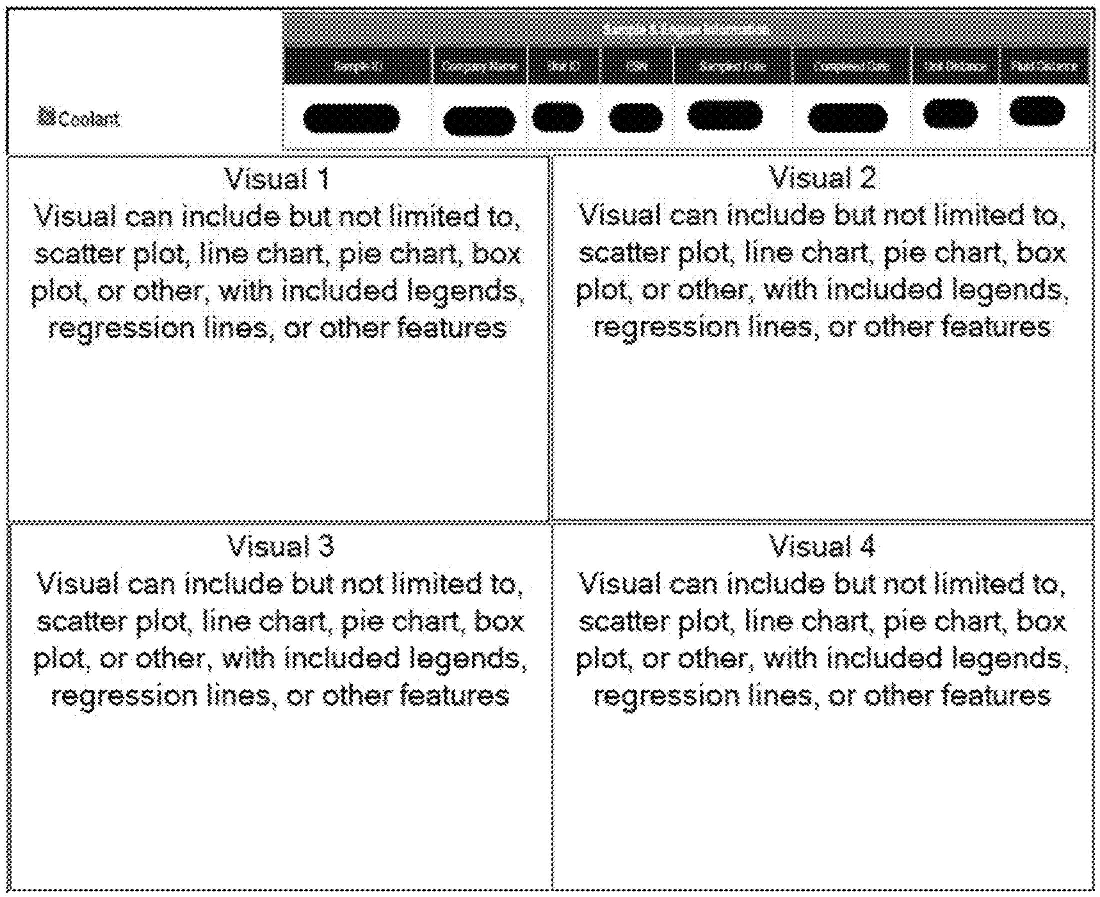
Figure 7E:
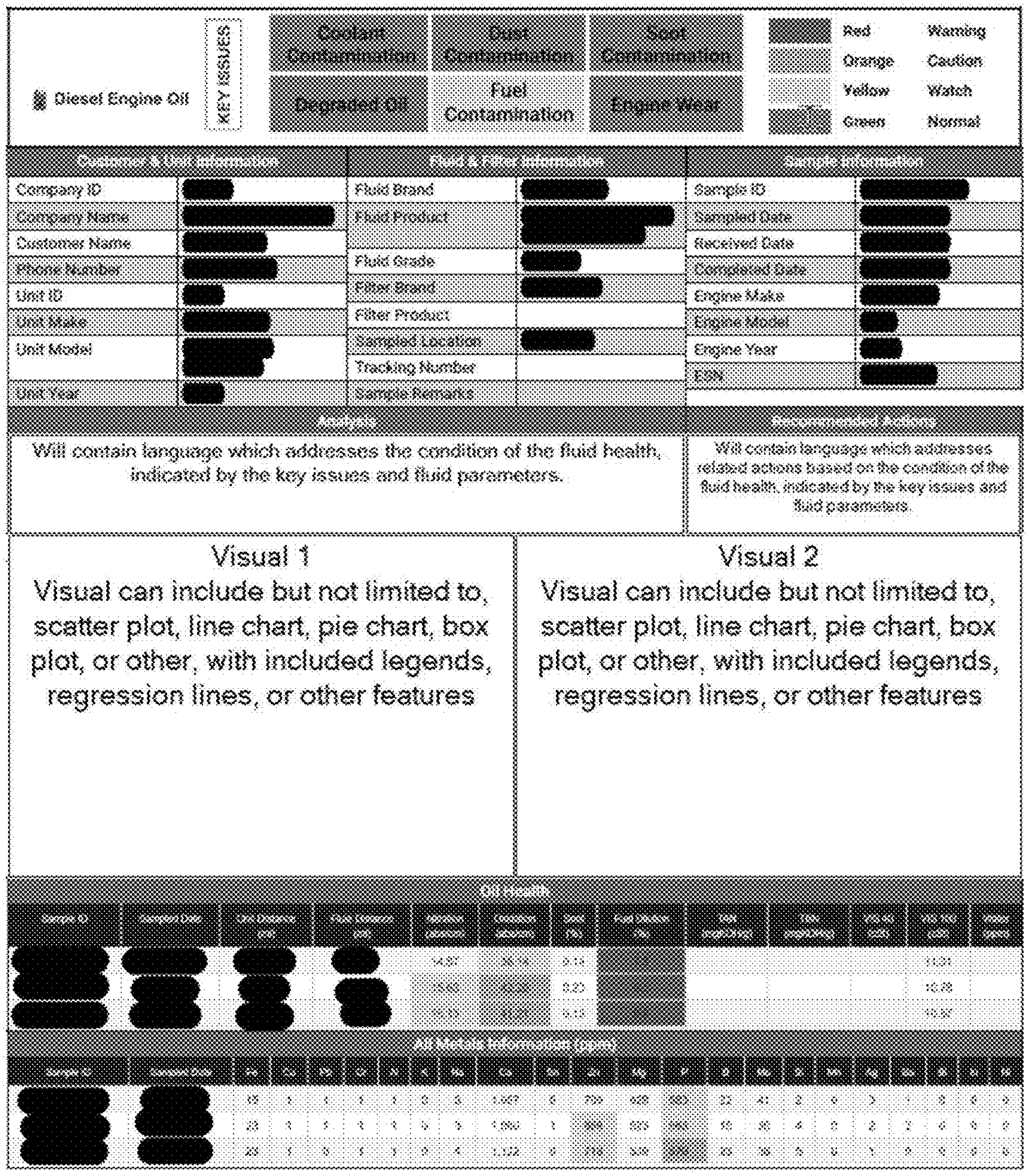
Figure 7F:
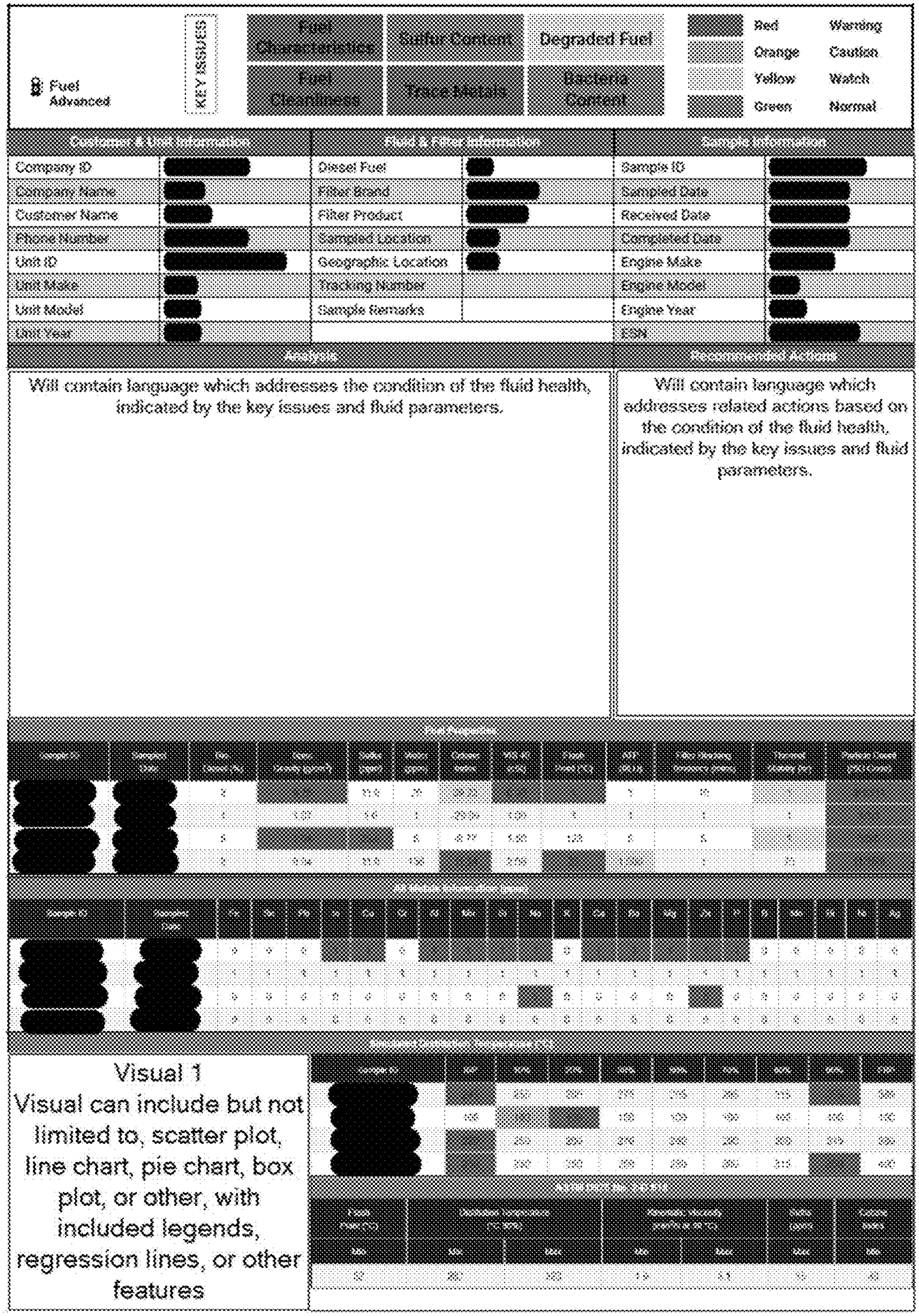
Figure 7G:
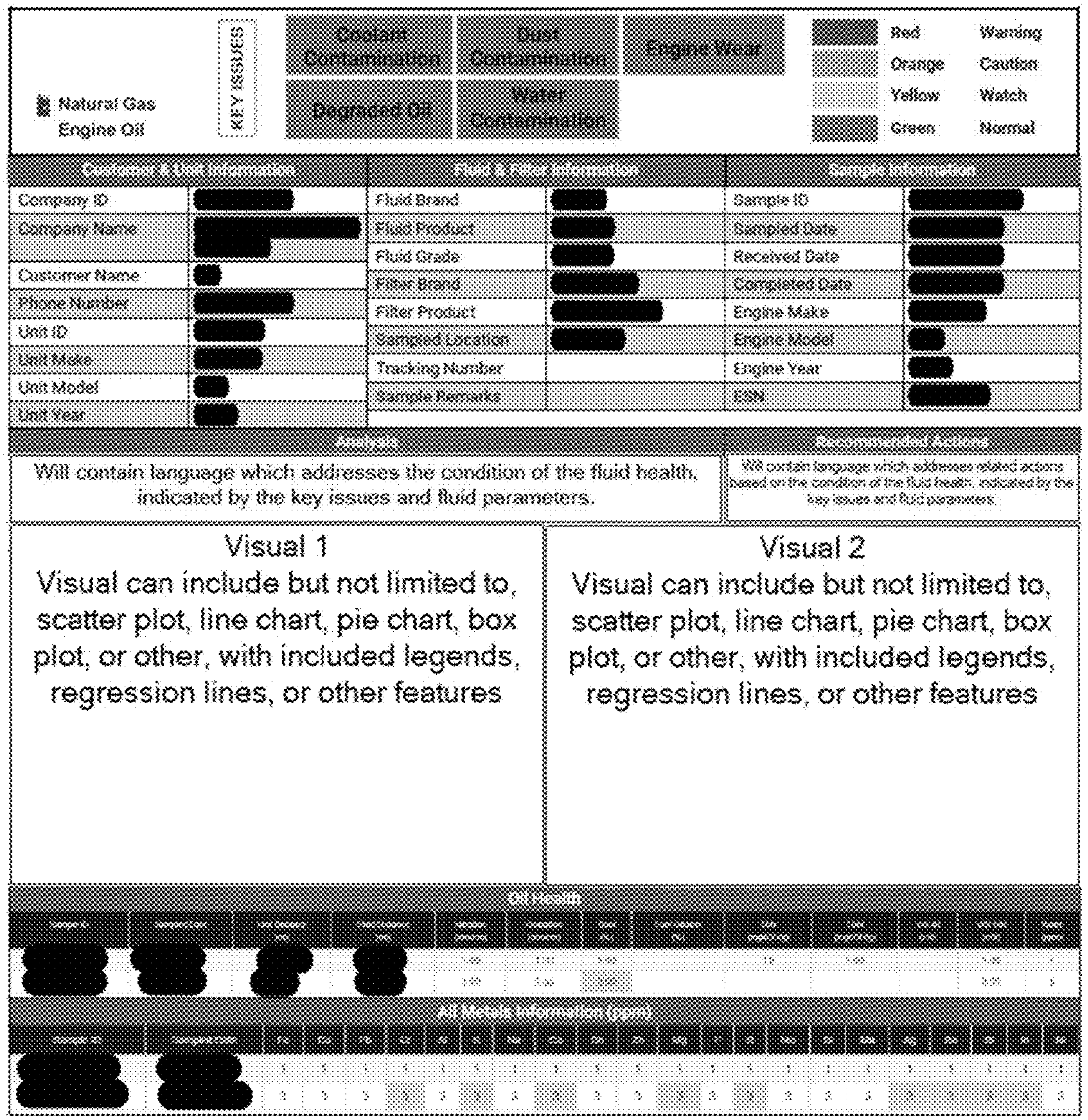

Referring to FIG. 7A, the fluid analysis report 700A can include various elements, information, or illustrations. For example, the report 700A can include an indication of a report type associated with the type of fluid being analyzed, such as diesel, natural gas, coolant, or fuel. The report 700A can include one or more key issue tags and flags. For example, a report 700A for diesel engine oil can include key issues of at least coolant contamination, dust contamination, soot contamination, degraded oil, fuel contamination, and engine wear. Report 700A for natural gas engine oil can include at least coolant contamination, dust contamination, engine wear, degraded oil, and water contamination. The coolant key issue can include at least improperly serviced, system corrosion, excessive contamination, degraded coolant, hard particle, or improperly selected. The key issues for diesel fuel can include at least fuel characteristics, sulfur content, degraded fuel, fuel cleanliness, trace metals, and bacterial content. A severity legend can be provided for the key issue flags, such as associating the flag color to the severity.

The report 700A can include customer and unit information (sometimes referred to as operator information), fluid and filter information, and sample information. The customer and unit information can include initial information submitted by the operator with the fluid sample for analysis. The fluid and filter information can include at least i) additional initial information submitted by the operator regarding the fluid submitted for analysis, ii) filter used in the vehicle 10, iii) sample remarks including notes provided by the operator regarding the fluid sample, iv) tracking number used to ship the sample to the laboratory for analysis, and/or v) location of the sample (e.g., sending location or receiving location). The sample information can include any information related to identifying or analyzing the sample, such as an identifier, when the sample was taken by the operator, received by the laboratory, and processed using one or more equipment, and information associated with the engine of the vehicle 10. The engine information can be a part of the initial information received from the operator. Examples of the customer and unit information, fluid and filter information, and sample information can be shown under the respective headers of the report 700A. The information and types of information provided in the report 700A can be configured, modified, customized, or adjusted by authorized personnel, such as administrators, engineers, experts, technicians, or personnel involved in analyzing the fluid sample.

The report 700A can include an analysis (e.g., comments) associated with the severity of individual key issues. For example, the analysis can indicate whether one or more engine failure issues are present or potentially present, the severity of individual (or combination of) key issues, and/or other key issue-related information. The analysis may indicate severities of one or more parameters associated with respective one or more key issues. In some cases, the analysis may include the severity of one or more parameters that are not at normal severity (e.g., watch, caution, or warning). The analysis can indicate the potential cause for the severity of a certain parameter or key issues, such as resulting from the accumulation of dirt or dust, wear or aging of a component, build-up of the compound, temperature fluctuation, etc. The analysis may be generated automatically, for example, based on at least one of the key issue severity, parameter severity, historical data of comparable population (e.g., population data), and historical record of the historical causes leading to high/low measurements of certain parameters. In some implementations, the analysis can be modified by experts or administrators to provide the operator with additional information related to the finding from the fluid sample.

The report 700A can include one or more recommended actions. The recommended actions can include comments associated with the action, such as the procedure to perform the action, effects from performing the action, and/or the reason for recommending the action. The remote computing system 35 can determine the recommended action based on at least historical actions performed on comparable vehicles, such as vehicles having similar key issue severities, parameter severities, or other conditions as the vehicle 10. The remote computing system 35 can recommend various actions based on the combination of key issue severities and the parameter severities resulting from analyzing the fluid sample. In some cases, the remote computing system 35 can modify the recommended action based on custom inputs from the administrators for the respective vehicle 10.

For example, the recommended action can include an instruction for the operator to continue monitoring the oil analysis treads. This instruction may be provided for the operator to resample oil at normal intervals. The action may include increasing the RPM, temperature, or configuring the operation of the vehicle engine to increase chemical reaction, perform active generation for certain components of the vehicle 10, or diagnose certain components. The action may indicate to change the oil, perform a transmission flush, visit a service center for maintenance, a time to resample the oil, or a time to perform a service event (e.g., visiting a service center earlier or later than normal time interval). Certain actions may be performed by the operator, such as changing the oil. Certain other actions may be performed at the service center. The report 700A can indicate actions that are recommended to be performed by the service center, for example.

In some implementations, the remote computing system 35 can determine a service cycle for the vehicle 10 based on a correlation between the respective performance of the vehicle 10 and corresponding vehicles (e.g., comparable vehicles). For instance, the remote computing system 35 can determine one or more service cycles recommended or followed by other vehicles. The remote computing system 35 may select at least one service cycle frequency based on at least one of the longevity or other performance considerations of the comparable vehicles. Accordingly, the remote computing system 35 can update or provide a recommended service cycle frequency as part of the recommended action.

The report 700A can include information or data on the comparable population of vehicles similar to the vehicle 10. For example, the population data may be represented via a plot or a graph based on at least a comparison between the state of the vehicle and the results of the fluid sample. For instance, the plot can provide historical data of comparison between parameter measurements and the mileage of vehicles from the comparable population. The plot can compare other measurements (e.g., severities of parameters or key issues) to other vehicle information (e.g., fluid information used, unit make, unit model, geographical location, etc.). The plot may include one or more indications of historical fluid analysis performed for the vehicle 10 (or the unit). The plot may include analysis data (e.g., client data or fluid sample data) based on the current fluid sample. The plot can illustrate the analysis data in relation to the population data and the historical unit data.

The report 700A can include the oil health data and metal information. The health data and metal information may be referred to as or correspond to the fluid analysis results or parameter measurements. The health data and the metal information can include one or more parameters associated with the fluid type. For example, the health data can include oxidation measurement, nitration measurement, soot percentage, fuel dilution, among others. In further example, the metal information can include any metal or elements identified from the analysis of the fluid sample. In some cases, the health data can include the status, condition, or health of the vehicle 10 (or components of the vehicle system), such as engine miles and oil miles (e.g., miles since oil replacement).

The report 700A can include other information in addition to the aforementioned information. In some cases, the report 700A may include more or less information based on at least the fluid type, analysis results, or equipment used to analyzed the fluid sample. The report 700A may include one or more sections, tabs, or windows. The sections may be presented in the same window or page of the report 700A. The remote computing system 35 can modify the arrangement of the sections and windows based on a configuration by the administrator or preferred set by the operator viewing the report 700A. For instance, the key issue flags can be presented on top of the report 700A, followed by the customer, unit, and sample information, the analysis and action, the population data, the oil health, and the metal information. In another example, for a brief summary of the report 700A, the remote computing system 35 may include the key issue flags, analysis, and actions on the first page of the report 700A, with additional information in other pages, tabs, or windows of the report 700A.

The one or more elements of the report 700A can be interactive elements, such as icons. For example, the operator can interact with the report 700A via a client device 54 (or, via a display screen in the vehicle 10). The client device 54 can display the report 700A via a display device of the client device. The client device 54 can display a GUI having the report 700A for the operator. In some implementations, the remote computing system 35 can generate the GUI including at least the information of the plurality of fluids, the score, the population data, and a metric of the vehicle 10, where the score can correspond to a risk level of at least one component of the vehicle 10. The GUI can include other information in addition to information from the report 700A. For instance, the GUI can include terminate, minimize, or maximize buttons to resize or terminate the report 700A. Accordingly, the client device 54 can receive the generated GUI provided from the remote computing system 35 to access the report 700A via an application or client portal, for example.

For example, the operator may interact with a phone number to initiate a call/text to the phone number. The operator may interact with the population data plot to zoom or magnify the plot. In some cases, interaction with the population, unit, or sample data point can initiate a pop-up window or push notification indicating the plotted values (e.g., oil miles, fluid health, or metal information associated with the data point). The operator may interact with one or more key issue flags to identify additional information associated with the respective key issue.

In some implementations, the interactive elements may trigger an operation of the vehicle system. For instance, the interaction with at least one recommended action may transmit (e.g., by the remote computing system 35) a signal to the controller 26. In response to receiving the signal, the vehicle system may initiate an operation. The operation can correspond to the description of the recommended action. In some cases, prior to the controller 26 controlling one or more components of the vehicle system, the operator interacts with an interactive element to accept or acknowledge the operation. In some cases, the score indicative of the performance of the vehicle can be an interactive element. Each interactive element can include or be embedded with an executable code to at least update the report 700A, provide instructions to the application used to view the report 700A, or control the vehicle system of the vehicle 10, for example. The vehicle 10 or components of the vehicle 10 may perform an action controlled by the vehicle system in response to the operator interacting with one or more interactive elements.

In some implementations, interacting with a respective key issue flag (e.g., score of the key issue) may initiate an action associated with a recommended action. For instance, a recommended action may be based on or associated with a key issue flag. In response to an interaction with the key issue flag, the associated recommended action may be performed (e.g., signal sent from the client device to at least one of the controller 200 or the vehicle system.

Referring to FIGS. 7B-G, the reports 700B-G (or portions of the reports 700B-G) can include similar elements, features, functions, categories of information, types of information, etc. for various different fluid types. For example, report 700B-D can include analysis of the coolant with different styles, formats, or configurations of the layout. The visual content of the report may be provided in the same or different report and/or on the same or different page of the report. The report 700E can include analysis of diesel engine oil, and report 700D can include analysis of fuel advanced (e.g., or other types of fuel). In some cases, certain key issues may be "grayed out", not shown, or uncategorized, for instance, based on an absence of certain parameters or fluid samples. The report 700G can include an analysis of natural gas engine oil. The various reports 700A-G can include different measurements, particles, among other results from each other. The reports 700A-G can include an expansion or miniature (e.g., partial or smaller representation) of one or more graphs presenting, for instance, at least the population data, results of the sample, and/or historical results of the vehicle 10 for coolant fluid.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various implementations, are intended to indicate that such implementations are possible examples, representations, or illustrations of possible implementations (and such terms are not intended to connote that such implementations are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (e.g., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary implementations, and that such variations are intended to be encompassed by the present disclosure.

While various circuits with particular functionality are shown in FIG. 2, it should be understood that the controller 200 may include any number of circuits for completing the functions described herein. For example, the one or more circuits of the controller 200 may be combined in multiple circuits or as a single circuit. Additional circuits with additional functionality may also be included. Further, the controller 200 may further control other activity beyond the scope of the present disclosure.

As mentioned above and in one configuration, the "circuits" may be implemented in machine-readable medium for execution by various types of processors, such as the processor 220 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Implementations within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one implementation, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary implementations is illustrative only. Additionally, any element disclosed in one implementation may be incorporated or utilized with any other implementation disclosed herein.

What is claimed is:

1. A computing system, comprising:

a processing circuit comprising one or more memory devices coupled to one or more processors, the one or more memory devices configured to store instructions that, when executed by the one or more processors, cause the processing circuit to:

obtain information regarding a plurality of fluids from a plurality of vehicles;

determine a plurality of thresholds based on the information regarding the plurality of fluids from the plurality of vehicles, wherein each threshold is specific to a fluid type of the plurality of fluids, an operating condition of a vehicle of the plurality of vehicles that yielded the information, and a risk level associated with the operating condition;

analyze a fluid sample from a particular vehicle to identify a fluid type of the fluid sample and a vehicle type of the particular vehicle;

retrieve a population of the obtained information pertinent to at least one of the identified fluid type of the fluid sample or the vehicle type of the particular vehicle;

retrieve a subset of thresholds associated with the retrieved population of the obtained information;

compare a plurality of characteristics of the fluid sample to the retrieved subset of thresholds, wherein each of the plurality of characteristics comprises a respective value indicative of a condition, composition, or contamination level of the fluid sample;

determine a risk level associated with each of the plurality of characteristics of the fluid sample based on the comparison, wherein the risk level corresponds to a severity category indicative of a potential maintenance action;

cause, responsive to the determination of the risk level, a dynamic graphical user interface on a computing device to render a first display comprising information regarding the comparison and the risk level along with an interactive element configured to enable a drill down of the plurality of characteristics of the fluid sample and provides at least one corresponding maintenance recommendation based on the risk level;

receive an indication of an update to the information regarding the plurality of fluids;

responsive to the update to the information regarding the plurality of fluids, retrieve an updated population of the updated information pertinent to the at least one of the identified fluid type of the fluid sample or the vehicle type of the particular vehicle;

determine, responsive to retrieving the updated population, a second risk level associated with each of the plurality of characteristics of the fluid sample based on a comparison between the plurality of characteristics of the fluid sample and a different subset of thresholds associated with the updated population of the obtained information pertinent to the at least one of the identified fluid type of the fluid sample or the vehicle type of the particular vehicle;

generate at least one second maintenance recommendation according to the plurality of characteristics of the fluid sample and the second risk level; and trigger, on the computing device subsequent to determining the second risk level and generating the at least one second maintenance recommendation, an update of the dynamic graphical user interface to render a second display comprising the plurality of characteristics of the fluid sample and the at least one second maintenance recommendation, wherein the plurality of characteristics of the fluid sample are arranged via the dynamic graphical user interface according to the second risk level associated with each of the plurality of characteristics.

2. The system of claim 1, wherein the dynamic graphical user interface comprises a graph depicting values associated with the retrieved population of the obtained information, and wherein an indicator regarding the plurality of characteristics is disposed on the graph in a visually contrasting way relative to the depicted values associated with the retrieved population.

3. The system of claim 1, wherein the instructions, when executed by the one or more processors, further cause the processing circuit to:

receive contact information regarding a user associated with the fluid sample; and generate and provide a link to the dynamic graphical user interface based on the contact information regarding the user.

4. The system of claim 3, wherein the instructions, when executed by the one or more processors, further causes the processing circuit to:

receive a credential for accessing the dynamic graphical user interface via the link;

receive an indication of the computing device accessing the link;

correlate the link to the received credential;

prompt the computing device for an access credential for accessing the dynamic graphical user interface; and provide access to the dynamic graphical user interface based on a received access credential for accessing the dynamic graphical user interface based on matching the received credential.

5. The system of claim 4, wherein the instructions, when executed by the one or more processors, further cause the processing circuit to deny access to the dynamic graphical user interface based on the received access credential being received outside a predefined time period following the prompt.

6. The system of claim 4, wherein the instructions, when executed by the one or more processors, further cause the processing circuit to compare an identifier associated with the computing device that provides the received access credential to a stored identifier regarding the computing device and provide access to the dynamic graphical user interface based on the received access credential matching the received credential and the identifier matching the stored identifier.

7. The system of claim 1, wherein the fluid type of the fluid sample is one of an engine oil, a coolant, a transmission fluid, a hydraulic fluid, or an aftertreatment system fluid, and wherein the instructions, when executed by the one or more processors, further cause the processing circuit to command a fluid analysis device to a determine concentration of a constituent in the fluid sample.

8. The system of claim 1, wherein the instructions, when executed by the one or more processors, further cause the processing circuit to:

receive the information regarding the plurality of fluids from the plurality of vehicles;

categorize the information by at least one of the fluid type, the vehicle type, and the operating condition regarding each of the plurality of vehicles; and determine a characteristic of the particular vehicle associated with the fluid sample based on the categorized information.

9. The system of claim 8, wherein the instructions, when executed by the one or more processors, further cause the processing circuit to:

retrieve a maintenance action associated with the determined characteristic of the vehicle; and populate the dynamic graphical user interface with at least the retrieved maintenance action, the characteristic of the fluid sample, the information regarding the plurality of fluids from the plurality of vehicles, and the operating condition of the particular vehicle.

10. The computing system of claim 1, wherein the instructions, when executed by the one or more processors, further cause the processing circuit to:

receive, from the computing device responsive to an interaction with the dynamic graphical user interface, an indication to execute a maintenance action, the maintenance action including an automatic operation of a controller of the vehicle; and generate and transmit, in response to the indication to execute the maintenance action, a command to the controller of the particular vehicle to perform the automatic operation including configuring an operational setting of at least one component of the particular vehicle according to at least one of the at least one corresponding maintenance recommendation or the at least one second maintenance recommendation.

11. A method, comprising:

obtaining, by a processing circuit comprising one or more memory devices coupled to one or more processors, information regarding a plurality of fluids from a plurality of vehicles;

determining, by the processing circuit, a plurality of thresholds based on the information regarding the plurality of fluids from the plurality of vehicles, wherein each threshold is specific to a fluid type of the plurality of fluids, an operating condition of a vehicle of the plurality of vehicles that yielded the information, and a risk level associated with the operating condition;

analyzing, by the processing circuit, a fluid sample from a particular vehicle to identify a fluid type of the fluid sample;

identifying, by the processing circuit, a vehicle type of the particular vehicle associated with the fluid sample;

retrieving, by the processing circuit, a population of the obtained information pertinent to at least one of the identified fluid type of the fluid sample or the vehicle type of the particular vehicle;

retrieving, by the processing circuit, a subset of thresholds associated with the retrieved population of the obtained information;

comparing, by the processing circuit, a plurality of characteristics of the fluid sample to the retrieved subset of thresholds, wherein each of the plurality of characteristics comprises a respective value indicative of a condition, composition, or contamination level of the fluid sample;

determining, by the processing circuit a risk level associated with each of the plurality of characteristics of the fluid sample based on the comparison, wherein the risk level corresponds to a severity category indicative of a potential maintenance action;

causing, by the processing circuit, responsive to the determination of the risk level, a dynamic graphical user interface on a computing device to render a first display comprising information regarding the comparison and the risk level along with an interactive element configured to enable a drill down of the plurality of characteristics of the fluid sample and at least one corresponding maintenance recommendation based on the risk level;

receiving, by the processing circuit, an indication of an update to the information regarding the plurality of fluids;

responsive to the update to the information regarding the plurality of fluids, retrieving, by the processing circuit, an updated population of the updated information pertinent to the at least one of the identified fluid type of the fluid sample or the vehicle type of the particular vehicle;

determining, by the processing circuit responsive to retrieving the updated population, a second risk level associated with each of the plurality of characteristics of the fluid sample based on a comparison between the plurality of characteristics of the fluid sample and a different subset of thresholds associated with the updated population of the obtained information pertinent to the at least one of the identified fluid type of the fluid sample or the vehicle type of the particular vehicle;

generating, by the processing circuit, at least one second maintenance recommendation according to the plurality of characteristics of the fluid sample and the second risk level; and triggering, by the processing circuit, on the computing device subsequent to determining the second risk level and generating the at least one second maintenance recommendation, an update of the dynamic graphical user interface to render a second display comprising the plurality of characteristics of the fluid sample and the at least one second maintenance recommendation, wherein the plurality of characteristics of the fluid sample are arranged via the dynamic graphical user interface according to the second risk level associated with each of the plurality of characteristics.

12. The method of claim 11, wherein the dynamic graphical user interface comprises a graph depicting values associated with the retrieved population of the obtained information, and wherein a visually contrasting indicator regarding the characteristic relative to the depicted values associated with the retrieved population is disposed on the graph.

13. The method of claim 11, further comprising:
receiving, by the processing circuit, contact information regarding a user associated with the fluid sample; and
generating and providing, by the processing circuit, a link to the dynamic graphical user interface based on the contact information regarding the user.

14. The method of claim 13, further comprising:
receiving, by the processing circuit, a credential for accessing the dynamic graphical user interface via the link;
receiving, by the processing circuit, an indication of the computing device accessing the link;
correlating, by the processing circuit, the link to the received credential;
prompting, by the processing circuit, the computing device for an access credential for accessing the dynamic graphical user interface; and
providing, by the processing circuit, access to the dynamic graphical user interface based on a received access credential for accessing the dynamic graphical user interface matching the received credential.

15. The method of claim 14, further comprising denying, by the processing circuit, access to the dynamic graphical user interface based on the received access credential being received outside a predefined time period following the prompt.

16. The method of claim 14, further comprising:
comparing, by the processing circuit, an identifier associated with the computing device that provides the received access credential to a stored identifier regarding the computing device; and
providing, by the processing circuit, access to the dynamic graphical user interface based on the received access credential matching the received credential and the identifier matching the stored identifier.

17. The method of claim 11, wherein the fluid type of the fluid sample is one of an engine oil, a coolant, a transmission fluid, a hydraulic fluid, or an aftertreatment system fluid, and wherein the method further comprises commanding, by the processing circuit, a fluid analysis device to determine a concentration of a constituent in the fluid sample.

18. A processing circuit, comprising:
one or more processors; and
one or more memory devices couple to the one or more processors, the one or more memory devices storing instructions that, when executed by the one or more processors, cause the one or more processors to:
obtain information regarding a plurality of fluids from a plurality of vehicles;
determine a plurality of thresholds based on the information regarding the plurality of fluids from the plurality of vehicles, wherein each threshold is specific to a fluid type of the plurality of fluids, an operating condition of a vehicle of the plurality of vehicles that yielded the information, and a risk level associated with the operating condition;
analyze a fluid sample from a particular vehicle to identify a fluid type of the fluid sample;

identify a vehicle type of the particular vehicle associated with the fluid sample;
retrieve a population of the obtained information pertinent to at least one of the identified fluid type of the fluid sample or the vehicle type of the particular vehicle;
retrieve a subset of thresholds associated with the retrieved population of the obtained information;
compare a plurality of characteristics of the fluid sample to the retrieved subset of thresholds, wherein each of the plurality of characteristics comprises a respective value indicative of a condition, composition, or contamination level of the fluid sample;
determine a risk level associated with each of the plurality of characteristics of the fluid sample based on the comparison, wherein the risk level corresponds to a severity category indicative of a potential maintenance action;
cause, responsive to the determination of the risk level, a dynamic graphical user interface on a computing device to render a first display comprising information regarding the comparison and the risk level along with an interactive element configured to enable a drill down of the plurality of characteristics of the fluid sample and at least one corresponding maintenance recommendation based on the risk level;
receive an indication of an update to the information regarding the plurality of fluids;
responsive to the update to the information regarding the plurality of fluids, retrieve an updated population of the updated information pertinent to the at least one of the identified fluid type of the fluid sample or the vehicle type of the particular vehicle;
determine, responsive to retrieving the updated population, a second risk level associated with each of the plurality of characteristics of the fluid sample based on a comparison between the plurality of characteristics of the fluid sample and a different subset of thresholds associated with the updated population of the obtained information pertinent to the at least one of the identified fluid type of the fluid sample or the vehicle type of the particular vehicle;
generate at least one second maintenance recommendation according to the plurality of characteristics of the fluid sample and the second risk level; and
trigger, on the computing device subsequent to determining the second risk level and generating the at least one second maintenance recommendation, an update of the dynamic graphical user interface to render a second display comprising the plurality of characteristics of the fluid sample and the at least one second maintenance recommendation, wherein the plurality of characteristics of the fluid sample are arranged via the dynamic graphical user interface according to the second risk level associated with each of the plurality of characteristics.

19. The processing circuit of claim 18, wherein the dynamic graphical user interface comprises a graph depicting values associated with the retrieved population of the obtained information, and wherein an indicator regarding the characteristic is disposed on the graph in a visually contrasting way relative to the depicted values associated with the retrieved population.

20. The processing circuit of claim 18, wherein the one or more memory devices store instructions that, when executed by the one or more processors, cause the one or more processors to:

receive contact information regarding a user associated with the fluid sample; and generate and provide a link to the dynamic graphical user interface based on the contact information regarding the user.

* * * * *